(12) United States Patent
Samid

(10) Patent No.: US 11,745,153 B2
(45) Date of Patent: Sep. 5, 2023

(54) QUANTUM FLUID OPERATION: TECHNOLOGY FOR EFFECTIVE MIXING, REACTING, AND SEPARATING FLUIDS

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 17/504,486

(22) Filed: Oct. 18, 2021

(65) Prior Publication Data
US 2022/0032246 A1    Feb. 3, 2022

Related U.S. Application Data

(63) Continuation-in-part of application No. 15/997,662, filed on Jun. 4, 2018, now Pat. No. 10,798,065.
(60) Provisional application No. 63/140,006, filed on Jan. 21, 2021.

(51) Int. Cl.
| | | |
|---|---|---|
| *B01F 31/40* | (2022.01) | |
| *B01F 31/65* | (2022.01) | |
| *B01D 15/18* | (2006.01) | |
| *B01D 3/00* | (2006.01) | |
| *B01D 57/02* | (2006.01) | |
| *B01F 23/53* | (2022.01) | |
| *B01F 35/92* | (2022.01) | |
| *B01F 35/12* | (2022.01) | |
| *B01F 35/22* | (2022.01) | |
| *B01F 25/23* | (2022.01) | |
| *B01F 25/452* | (2022.01) | |
| *B01D 33/01* | (2006.01) | |
| *B01D 33/46* | (2006.01) | |
| *B01F 101/00* | (2022.01) | |

(52) U.S. Cl.
CPC .............. *B01F 31/65* (2022.01); *B01D 3/008* (2013.01); *B01D 15/18* (2013.01); *B01D 33/015* (2013.01); *B01D 33/466* (2013.01); *B01D 57/02* (2013.01); *B01F 23/53* (2022.01); *B01F 25/23* (2022.01); *B01F 25/4521* (2022.01); *B01F 31/40* (2022.01); *B01F 35/123* (2022.01); *B01F 35/2209* (2022.01); *B01F 35/92* (2022.01); *B01F 2101/2204* (2022.01)

(58) Field of Classification Search
CPC ........................................................ B01F 31/40
USPC ...................................... 366/189, 333, 181.8
See application file for complete search history.

(56) References Cited

U.S. PATENT DOCUMENTS

| | | | | |
|---|---|---|---|---|
| 522,944 A | * | 7/1894 | Saltsman ............ | B01F 33/5011 366/333 |
| 593,333 A | * | 11/1897 | Park ..................... | B01L 3/50215 222/386 |
| 1,175,366 A | * | 3/1916 | Lucus .................... | B01D 47/02 261/33 |
| 1,744,449 A | * | 1/1930 | Dawson ................... | A01J 15/00 99/465 |
| 1,842,939 A | * | 1/1932 | Hancock ............. | B01F 35/3231 366/187 |
| 1,998,692 A | * | 4/1935 | Rossen ..................... | A61C 5/68 222/386 |

(Continued)

FOREIGN PATENT DOCUMENTS

DE            2825230 A   * 12/1979

*Primary Examiner* — David L Sorkin

(57) ABSTRACT

A continuous chemical process is modified to allow parts thereto to be processed one quantum of matter at a time. This offers precision and efficiency beyond what is possible with the continuous mode. This Quantum Fluid Operation (QFO) is applied to basic unit operations: mixing, reacting, separating.

6 Claims, 23 Drawing Sheets

Quantum Fluid Processor

(56) References Cited

U.S. PATENT DOCUMENTS

| | | | | |
|---|---|---|---|---|
| 2,420,616 | A * | 5/1947 | Palmer | A23D 7/02 |
| | | | | 366/276 |
| 3,140,078 | A * | 7/1964 | Krahe | B01F 35/7161 |
| | | | | 222/386 |
| 3,608,869 | A * | 9/1971 | Woodie | B01F 35/833 |
| | | | | 366/132 |
| 4,265,266 | A * | 5/1981 | Kierbow | G05D 11/132 |
| | | | | 366/159.1 |
| 6,402,364 | B1 * | 6/2002 | Esclar | B01F 35/7174 |
| | | | | 366/276 |
| 2008/0144432 | A1 * | 6/2008 | Samid | G06K 19/06037 |
| | | | | 235/494 |
| 2014/0106124 | A1 * | 4/2014 | Hicks | C03C 1/002 |
| | | | | 524/847 |
| 2015/0023129 | A1 * | 1/2015 | Krzywdziak | B01F 29/31 |
| | | | | 366/198 |
| 2020/0138084 | A1 * | 5/2020 | Van Mourik | A23P 30/00 |

* cited by examiner

Fig.-1
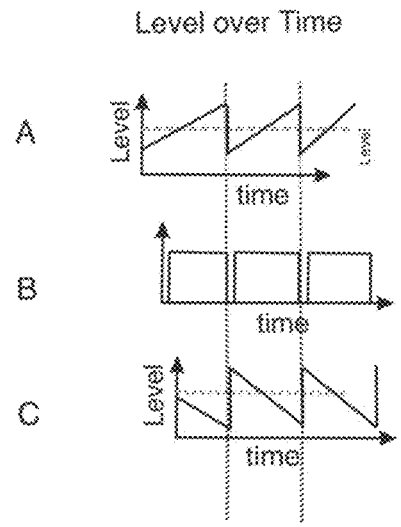
Fig-2
Quantum Procesing v. Nominal Processing
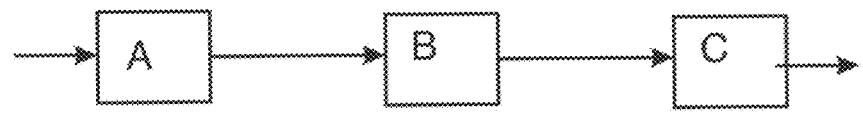
Nominal Continuous Flow
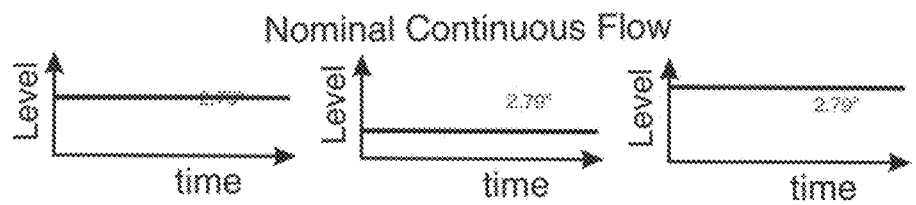
Quantum Fluid Processor
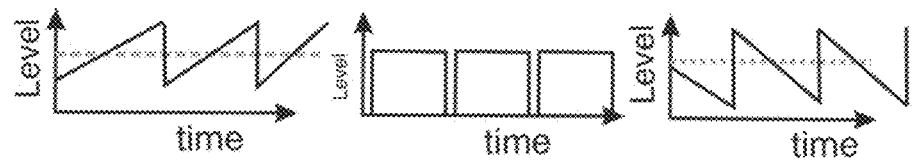

Continuous Flow Stirred Tank Operation

Quantum Fluid Processor

A PMH Quantum Sequence

Internal State Switch for the PMH

Two Discs Piston Assembly

Chain Driven PMH Piston

Entropic Measurements through
Fluid Conductivity Measurements

Ten Different Mixing Regimens

Fig.-16
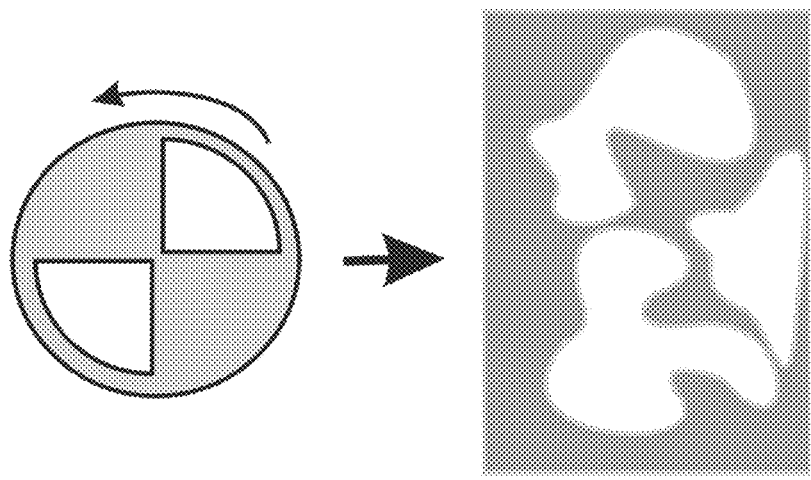
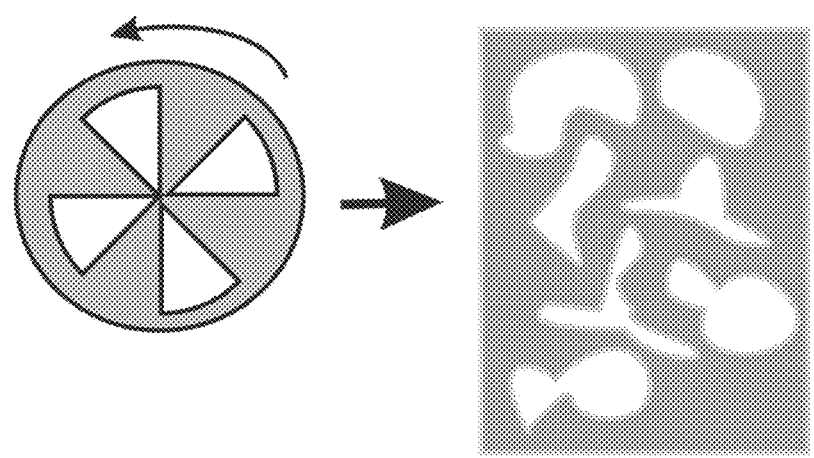
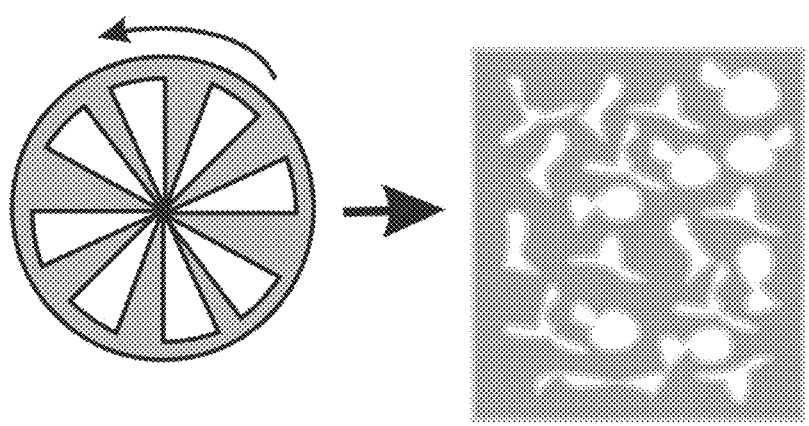
Graduated (Entropic) Pump-Mixing

PMH in a Non-Atmospheric Pressure Environment

Serial Configuration of two PMH units

Two Consecutive PMH Units Sharing a Cylinder

Quantum Fluid Dynamics: Pump-Mixer Heat Exchcanger

Array of two ingredients and three PMH units

PMH Basic Control Diagram

PMH Array Control

Precise injection Application

Precise Injection Sequence

Electric Charge Quantum Separation

Quantum Fluid Separation Cascade

Slurry/Suspension QFO Separation

Rotating Scraping Blade in QFO

Slurry Clearing QFO Cascade

Hole Size Adjustment

Slurry Clearing QFO Apparatus

QFO Chromatography

QFO Frequency Separation Strategy

QFO Distillation

QUANTUM FLUID OPERATION: TECHNOLOGY FOR EFFECTIVE MIXING, REACTING, AND SEPARATING FLUIDS

CROSS REFERENCE TO RELATED PROVISIONAL APPLICATIONS (CLAIMED BY THE CONTINUED APPLICATIONS)

Continuation in Part of U.S. patent application Ser. No. 17/063,523 filed Oct. 5, 2020

This application is also a continuation in part of U.S. patent application Ser. No. 15/997,662 filed Jun. 4, 2018.

Provisional Application 62/580,111 filed Nov. 1, 2017 Referenced in the continued application Ser. No. 15/997,662, and Provisional Application 63/034,401 filed Jun. 4, 2020, Provisional Application 63/051,652 filed Jul. 14, 2020, Provisional Application 63/005,062 filed Apr. 3, 2020, Provisional Application 62/963,855, filed Jan. 21, 2020, Provisional Application 62/931,807 filed Nov. 7, 2019, Provisional Application 62/926,560 filed Oct. 27, 2019, Provisional Application 63/140,006, filed Jan. 21, 2021.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

A growing number of industrial chemical processes require precision and efficiency that the nominal continuous flow operation cannot provide. Such operations are handled in batch mode where a fixed quantity of matter is handled with the desired precision. A challenge arises how to match the precision possible with batch processing with the high flow rate and high degree of automation found in continuous processing. This invention describes a way to apply batch precision within an otherwise continuous operational flow. Particular embodiments are described for several unit operations: mixing, reacting and separating. This technology also applies to the use cases described in the continued application.

BRIEF SUMMARY OF THE INVENTION

Nominal industrial chemistry operates as a steady state continuous flow. Proposing to interject into this flow a quantum fluid processor, handling a quantum of fluid at a time. The up and down stream will remain in continuous regimen, but the quantum fluid elements will be handled as a per element focus, and thereby improve the efficiency of operation. This quantum fluid operation (QFO) is herewith applied to standard chemical engineering operation. The pump, the mixer and the heat exchanger are known as distinct and separate unit operations nominally applied to a continuous flow. Proposing to unite them and achieve better fluid control, and more efficient chemical processing. One cuts a continuous fluid flow to a series of fluid-quanta; pumping each quantum, mixing it, adjusting its temperature, allowing for a reaction to occur, then releasing the processed quantum to the continuous flow ahead. In a particular embodiment of this technology each quantum of fluid comprising ingredients to be mixed (and react) will be suctioned via a double disc piston into a cylinder. Once the quantum of fluid is captured in the cylinder, the discs of the piston will shift one towards the other and thereby expose overlapping holes. When the piston moves back, it also rotates. The inflow is locked, and the captured fluid is forced to flow via the holes in the piston, and get mixed. The piston may swing back and forth with its holes exposed to achieve the desired measure of mixing. All the while the wall of the cylinder is the surface of a heat exchanger, adjusting the temperature of the captured fluid to the desired measure. When the captured fluid is at the desired state, the discs of the piston re-align so that the holes in the piston are blocked and the piston pushes the cylinder captured fluid through a timely opened output line, and while so it suctions in the next quantum of fluid from the inlets. The quanta of fluid are pumped in and out of capacity tanks so that before and after the Quantum Fluid Processor the flow remains continuous. Applied to separation this technology builds a flow-through advantage to constituent X of a fluid, relative to constituent Y, and thereby achieves an X-rich fluid behind the moving piston, and a Y-rich fluid ahead of the moving piston. QFO is versatile in system size, fluid viscosities, and pace of operation.

Overview

Nominal industrial chemistry operates as a steady state continuous flow. Proposing to interject into this flow a quantum fluid processor, handling a quantum of fluid at a time. The up and down stream will remain in continuous regimen, but the quantum fluid elements will be handled as a per element focus, and thereby improve the efficiency of operation. This quantum fluid operation (QFO) is herewith applied to standard chemical engineering operation. The pump, the mixer and the heat exchanger are known as distinct and separate unit operations nominally applied to a continuous flow. Proposing to unite them and achieve better fluid control, and more efficient chemical processing. One cuts a continuous fluid flow to a series of fluid-quanta; pumping each quantum, mixing it, adjusting its temperature, allowing for a reaction to occur, then releasing the processed quantum to the continuous flow ahead. In a particular embodiment of this technology each quantum of fluid comprising ingredients to be mixed (and react) will be suctioned via a double disc piston into a cylinder. Once the quantum of fluid is captured in the cylinder, the discs of the piston will shift one towards the other and thereby expose overlapping holes. When the piston moves back, it also rotates. The inflow is locked, and the captured fluid is forced to flow via the holes in the piston, and get mixed. The piston may swing back and forth with its holes exposed to achieve the desired measure of mixing. All the while the wall of the cylinder is the surface of a heat exchanger, adjusting the temperature of the captured fluid to the desired measure. When the captured fluid is at the desired state, the discs of the piston re-align so that the holes in the piston are blocked and the piston pushes the cylinder captured fluid through a timely opened output line, and while so it suctions in the next quantum of fluid from the inlets. The quanta of fluid are pumped in and out of capacity tanks so that before and after the Quantum Fluid Processor the flow remains continuous. Applied to separation this technology builds a flow-through advantage to constituent X of a fluid, relative to constituent Y, and thereby achieves an X-rich fluid behind the moving piston, and a Y-rich fluid ahead of the moving piston. QFO is versatile in system size, fluid viscosities, and pace of operation.

BRIEF EXPLANATION OF DRAWINGS

FIG. 1 Quantum Raid Operation Dynamics

Figure 3:
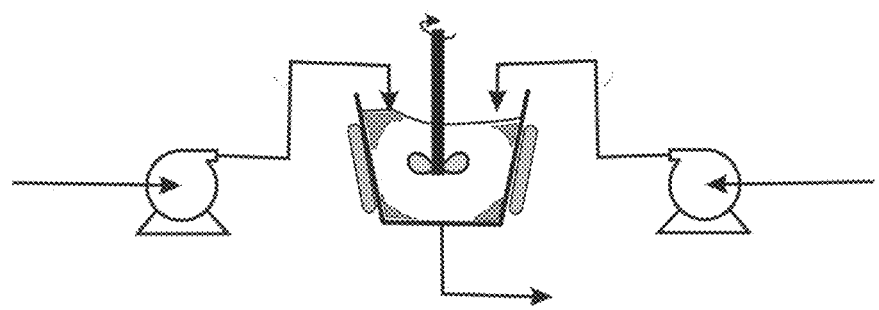

This figure depicts the level of fluid over time within a sequence of three consecutive operational units: A, B, and C, when the Quantum Fluid Operation (QFO) is applied. At a starting point $t_0$ a quantum of fluid, q, is taken out from A to B, in virtually at once, then the outlet from A to B is blocked. As a result the feed from X to A (which is not affected) gradually increases the level of fluid in A (as shown in the straight upward line, a. Once the quantum q is taken into unit B, the connection from B to C is also blocked. As a result the level of fluid in C gradually sinks. That is because unit C keeps sending fluid to the following unit, Y. At the same time the quantity of fluid in unit B remains constant since the connections to and from B are blocked. This situation lasts for time $t_q$, which is the time unit B takes to focus on the captured quantity q now under its focus. At time $t_1 = t_0 + t_q$, unit B at once opens the 'gates' to units A and B. Unit B then pushes downstream to unit C the captured quantity of fluid, q. This is depicted as a vertical (in reality nearly vertical) line showing the quantity of fluid in C undergoes an upward step function, and extra amount q is added. At the same time (give or take) unit B while dispensing q into unit C, is pulling another quantum of measure q from its feed unit A. This also happens virtually at once, and it shows as a downward vertical line. This completes one cycle where a quantity of fluid q is captured by unit B for dedicated processing, then another quantity q is taken up. This is depicted in the flat line for unit B in the drawing. As far as unit X and Y are concerned, the flow is stable, no indication of the quantum fluid handling protocol. This is the fundamental dynamics of the quantum fluid operation.

FIG. 2: Quantum Processing v. Nominal Processing

This figure shows a three units string of a chemical continuous process: Unit A streams to unit B which streams to unit C. Below this diagram it shows the level over time in each of the three consecutive units. In a typical steady state continuous operation the level of fluid in each unit is stable over time, which is what the figure shows. Below that the figure depicts the level over time in the quantum processing regimen. In unit A the fluid level rises for a period of time $t_q$ because for that period of time the outlet is blocked and the inflow keeps elevating the level of fluid in unit A. The figure also shows how in unit C the level of fluid first declines, because for a period of time $t_q$ there is no feed from unit B, but the outlet to the next unit is still on. For this entire period ($t_q$) unit B holds on to fixed amount q of the fluid. After time $t_q$ from the beginning of activating this regimen, unit B pushes its entire content, q to unit C, which is depicted as a rising vertical line in C, while at the same time pulling out of unit A the same amount q, causing the level in unit A to plummet in the amount q. This dynamics repeats itself every $t_q$ time. In practice the lines in the three units are not completely vertical, since it takes some time to move a block q from unit to unit.

FIG. 3: Continuous Flow Stirred Tank Operation

This figure shows the standard configuration for industrial chemical reactors. Ingredients are pumped into the reactor—an open tank. The tank is fitted with a mixer that generates intimate contact between the pumped ingredients. The figure shows that typically in such setup there remain 'unmixed zones' in the stirred tank where fluid is unaffected much by the rotating blades of the mixture. This leads to variance in residence time within the reactor and to product inconsistency.

Figure 4:
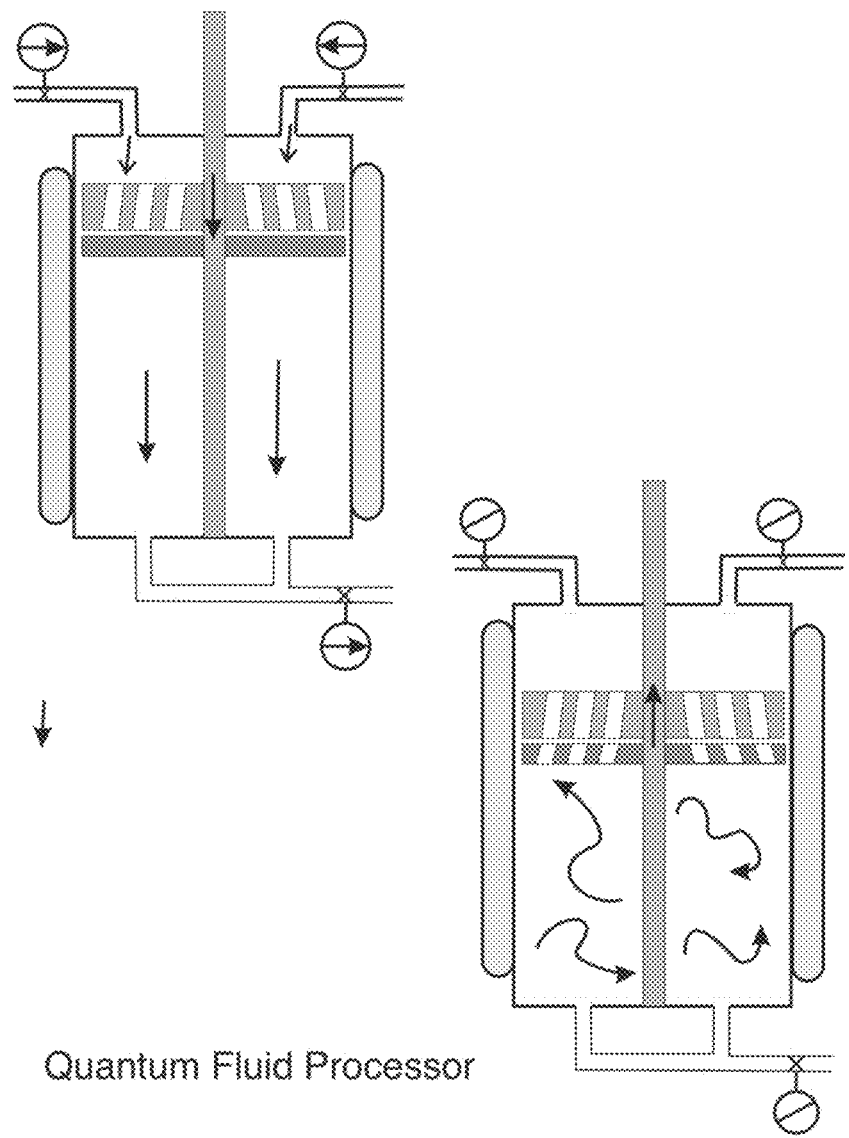

FIG. 4: Quantum Fluid Processor

This figure shows an embodiment of the quantum fluid operation (QFO) in the form of a pump-mixer-heat-exchanger (PMH). At the left top of the drawing a cylinder is depicted. The cylinder functions as the reactor, a functional match to the classical chemical reactor shown in FIG. 3. It has entry points for the ingredients that are used for the products. The entry points connect to pipelines to let the ingredients in. Every pipeline is fitted with a gradual valve. The figure at the upper left side shows two ingredients both with the valves in the "open" state. Inside the cylinder a piston is shown. The piston in the picture is comprised of two discs (two parts). The top one is shown with slanted holed drilled into it, while the bottom disc is shown without any flow ports. This means that the piston as a whole does not admit any flow of fluid through it. The upper left part of the figure shows the piston pushed down And since the inlet valves are open, the pull down of the piston creates pressure imbalance that pulls the ingredients into the cylinder as the piston travels down. The figure also shows that the outlet of the cylinder is connected to an disposing pipeline which is also fitted with a valve, which in the figure is shown in the open state. If there was any fluid below the piston before it started its travel downward then this fluid is pushed by the piston through the open outlet line to whatever is next in the overall chemical processing. When the piston finishes its movement and rests on the bottom of the cylinder, then the previous content of the cylinder was sent ahead while new quantum of fluid comprising the inlet ingredients is now filling up the cylinder volume.

What happens next is depicted in the lower-right side of the figure. All the valves are flipped closed (inlets and outlet). The piston as such now undergoes a critical transformation. The previously normal piston is turned into a piston with holes. In this particular figure this happens by turning the lower disc of the piston such that holes drilled in it, are now aligned with matching holes drilled in the upper disc. The piston now becomes a "sieve". The drilled holes are shown to be slanted. Once the piston changed its state from 'nominal' to 'sieve state', it starts it move upwards. When this happens the piston applies pressure on the fluid captured in the cylinder above it. The inlet lines are closed, so the trapped fluid has no way to go, except to be squeezed through the drilled holes in the piston. This is helped by the vacuum that builds up below the rising piston because the amount of fluid in that region is limited. As the piston travels upwards the fluid trapped above it, is squeezed through the piston holes to the below-piston section. Optionally the piston will rotate while traveling upwards. This step imposes an act of mixing on the trapped fluid. When the piston arrives at the top of the cylinder, it can either travel down and up again once or many times, but at some point after reaching the top level of the cylinder, the sequence will repeat as described here above, and shown on the upper left part of the drawing.

Figure 5:
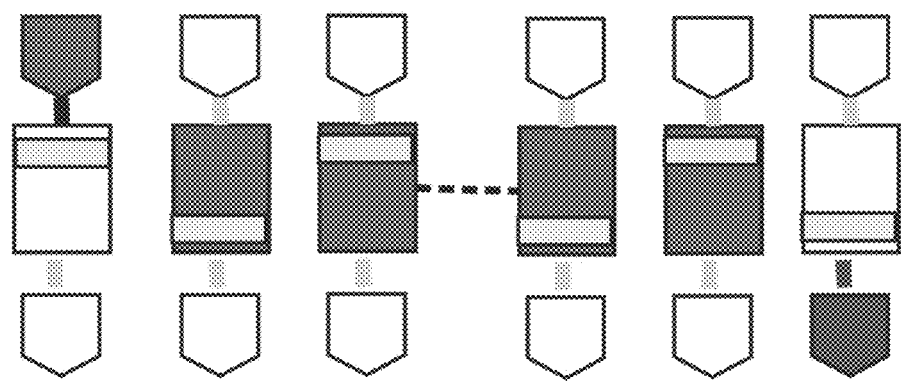

FIG. 5: A PMH Quantum Sequence

This figure depicts the PMH sequence. the first step shown on the left depicts a full feedstock device (dark) and an empty (white) cylinder as well as outlet container. It shows the piston at the upper end state. The next step is shown right to that leftmost part in which the feedstock container is empty because the content a quantum of fluid was pulled into the container as the piston in the "closed" position moved downward to the bottom of the cylinder. The output container is still empty (white), and the cylinder is shown full (dark). The next stage show the piston after it traveled up in the cylinder (this time in an "open" state, not shown). As it does so the fluid captured in the cylinder is flowing through the holes in the piston to below the piston. There is no effect on the feedstock nor on the output containers. The figure then shows that the next step is another push of the piston from the upper position to the lower position, so traveling in the "open" state where the fluid from the bottom part streams through the holes to the upper parts. The figure shows that this pair of movement down then up can happen any number of time, and it carried on until the captured fluid in the cylinder reaches the desired state and is ready to be pushed out from the cylinder to the next stage in the process. The last (rightmost) part of this figure shows the piston pushing out the contents of the cylinder. In this figure in the rightmost end the feedstock container is shown empty to represent the case where only one round of captured fluid is processed. In reality for a continuous flow the rightmost stage will show that while the piston pushes down the ready cylinder content, it pulls in a new quantum of fluid to undergo the same treatment. And also in the normal sequence the leftmost stage will show that while the piston travels down it pushes out the former captured quantum.

Figure 6:
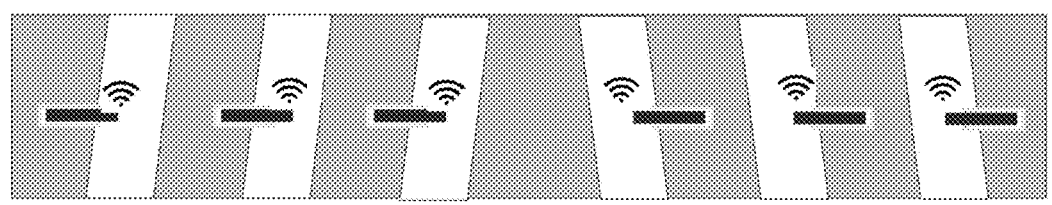

FIG. 6: Internal State Switch for the PMH

This figure shows the piston in a design where inside the piston there are sliding discs that can be flipped to shut down the holes drilled into the piston, or they can be flipped to recede into the body of the piston and thereby clear the passage of fluid from one side of the piston to the other. The flipping discs can be controlled via Bluetooth as shown in the figure, but they can also be pre-programmed since it is predictable and known where the piston is at each moment and whether it is time to mix the fluid in the container or to pump it in and out.

Figure 7:
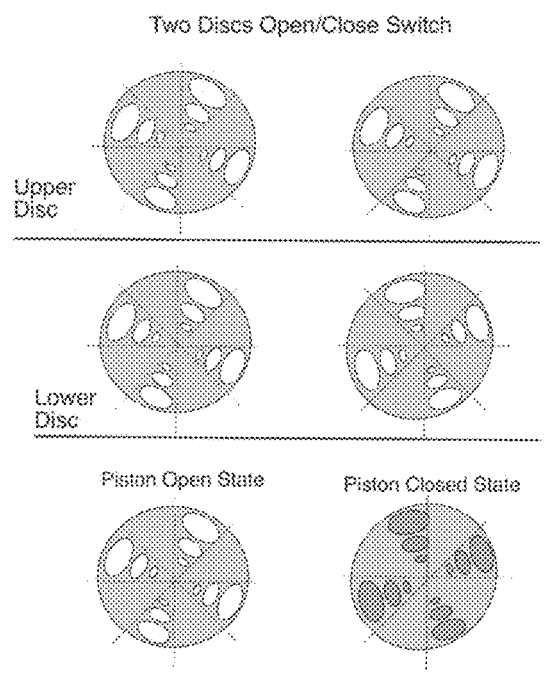

FIG. 7: Two Discs Open-Close Switch

This figure shows the piston prepared from two abreast discs of similar holes drilling. In the left column of the figure the upper disc and the lower disc are aligned so that the holes are overlapping and as a result in that state the traveling piston will admit fluid to go through it. By contrast in the state depicted in the right column the discs are aligned so that their holes are not overlapping and in that state no fluid can pass through the piston.

Figure 8:
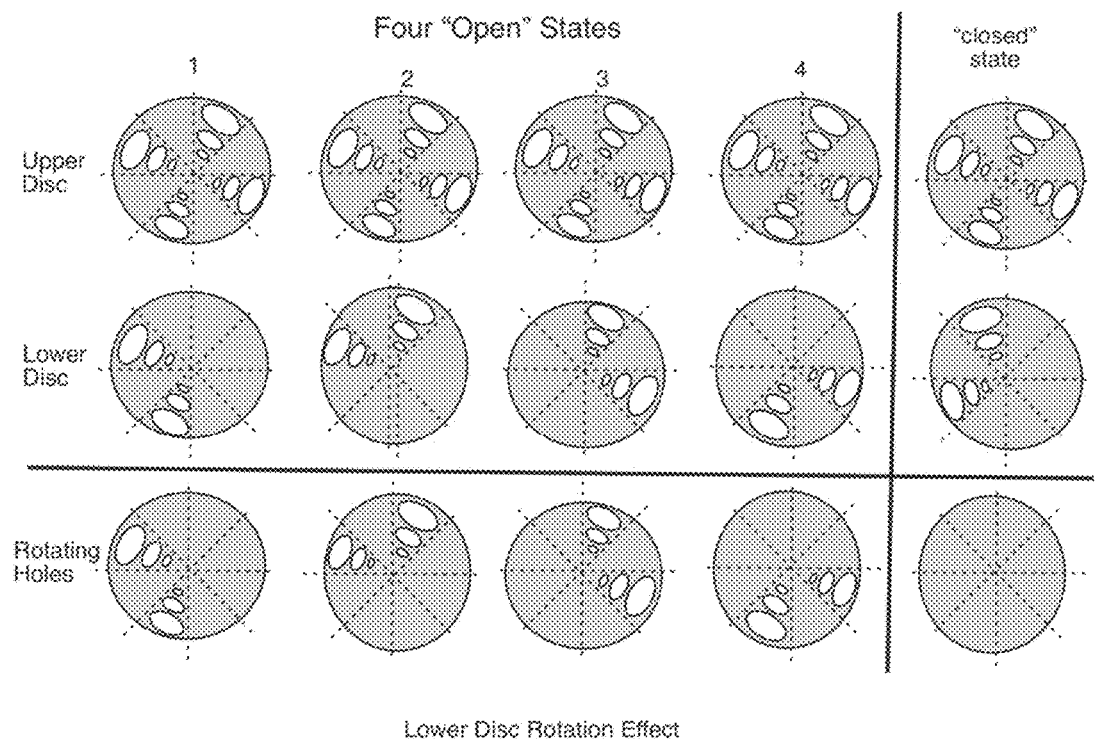

FIG. 8: Four Open States

This figure shows a special configuration where the lower disc has fewer holes drilled into it, compared to the upper disc. As a result, as is shown when the discs rotates one relative the other they define four distinct states of passable-holes. This appears on the outside that the fluid has to shift its passage every time the discs shift the relative states. This shifting is a strong mixing contributor. The figure also show, on the rightmost column how the holes are aligned so that there is no passage of fluid through the piston.

Figure 9:
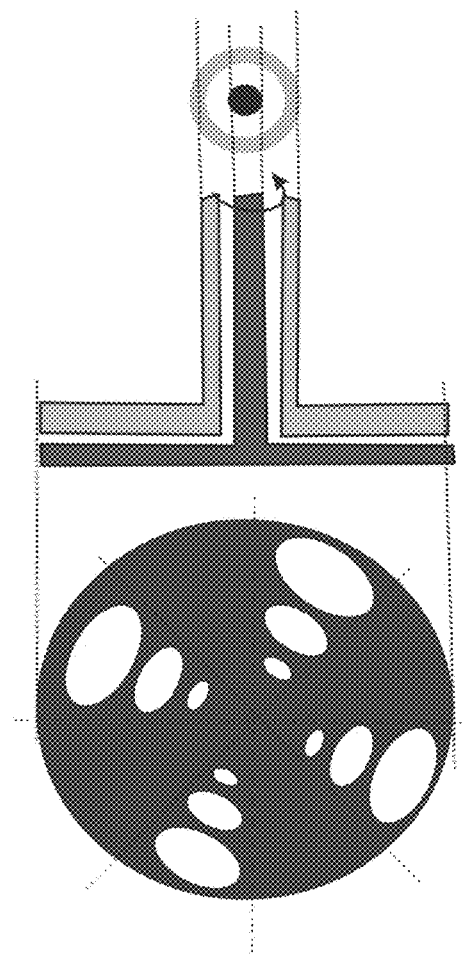

FIG. 9: Two Discs Piston Assembly

This figure shows an assembly of two discs where the lower disc is handled by a shaft that is placed inside the hole-drilled shaft of the other disc, thereby the lower disc can be rotated relevant to the upper disc so as to control whether the two discs assembly comes forth with open holes for the liquid to come through, or whether it is blocked. The figure shows the "open" state where the two discs have 12 holes for the fluid to go through.

Figure 10:
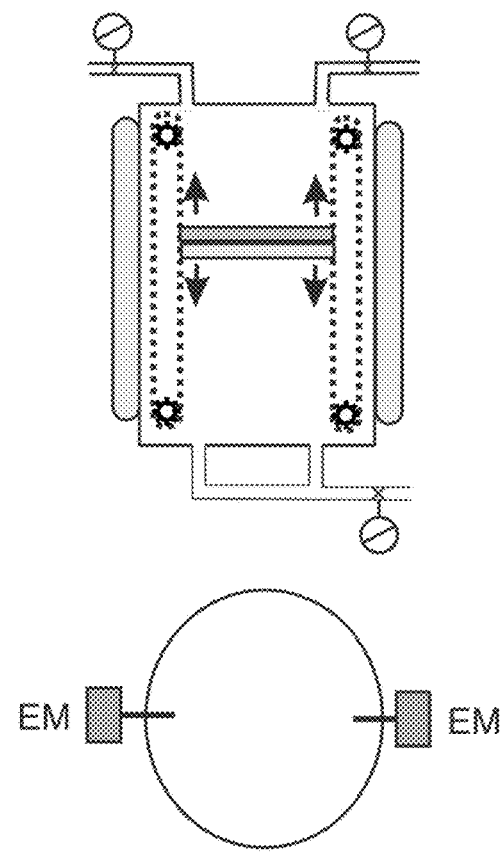

FIG. 10: Chain Driven PMH Piston

This figure shows the discs inside the mixing cylinder where their position is determined by an in-cylinder chain contraption. The bottom of the figure shows the two electric motors that operate through an fitted axis passing power from outside the cylinder into the internal chains which in turn move the piston (the discs) up and down. The two discs can be aligned through having the chain links fitted in two positions. Otherwise the chain motioned piston can be constructed from one disc with internal discs to cover the holes.

Figure 11:
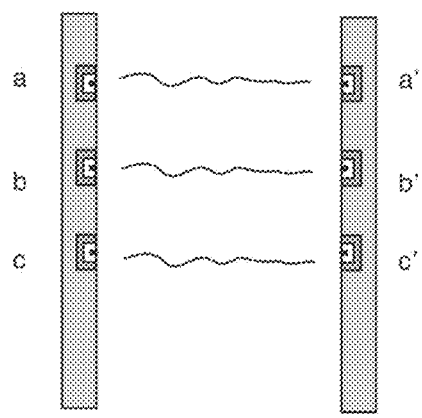

FIG. 11 Entropic Measurements through Fluid Conductivity Measurements

The degree of mixing in the cylinder can be characterized by the mixture effective resistance between two fixed points. This method will work when the mixed ingredients have different conductivities. At a given instance one would apply an electric potential between points a and a' and measure the effective resistance $R_a$ between them. The one would shift the electrical potential to apply between points b and b' and measure the effective resistance between these two points, $R_b$, and so the same with respect to points c and c' to measure $R_c$. The three measurements are taken very fast one after the other. If the contents of the cylinder is well mixed that one will expect:

$$R_a = R_b = R_c$$

To the extent that mixing is not intimate then the three values will differ. The electrical ports are placed in a recess mode, not to integer with the motion of the piston up and down. These ports are also insulated from the walls of the cylinder so that the electrical current measured will be current that flows through the fluid captured in the cylinder.

Figure 12:
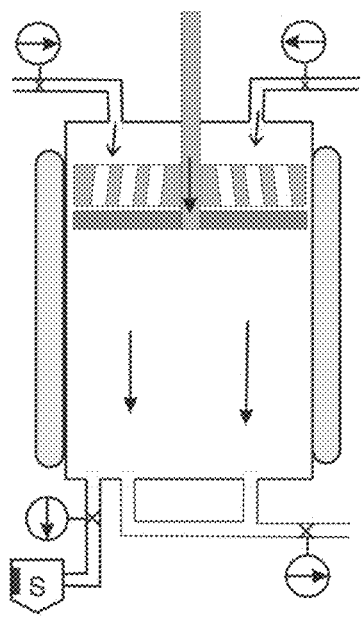

FIG. 12 Sampler Feedback Operation

This figure shows a PMH contraption fitted with an outlet that feeds into a sampling chamber. At will this outlet is opened and a small amount of the fluid in the cylinder is pushed to the sampling chamber. The inlet valve is immediately closed. The sampled fluid is then measured for temperature, and content, to provide feedback to the PMH controller whether the mixing and the expected reaction has reached the desired state, or whether more mixing (having the piston run up and down over the trapped fluid) is needed.

Figure 13:
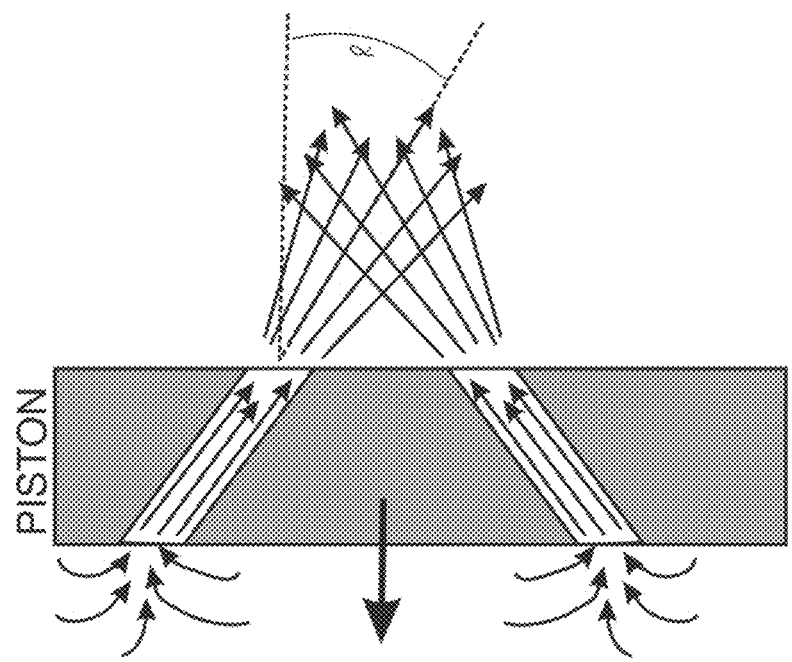

FIG. 13 Colliding Jets

This figure shows a cut in the piston where two holes (tunnels) are inclined in an angle $\alpha$ off the vertical direction such that the fluid that flows in the two tunnels is destined to create a collision once the jets emerge from the piston. This collision has the effect of mixing of the two jets. By designing the piston with certain thickness the fluid that rushes through the tunnels is assuming momentum in the direction of the tunnel. One will optimize the value of $\alpha$. The larger the value of $\alpha$ the greater the effect of the collision in terms of mixing. But in turn, the longer the 'trip' of the fluid inside the tunnel where friction eats away the momentum of the jet, and more energy is required to achieve the same effect. To the extent that the piston rotates horizontally, the effect of the collision is less critical.

Figure 14:
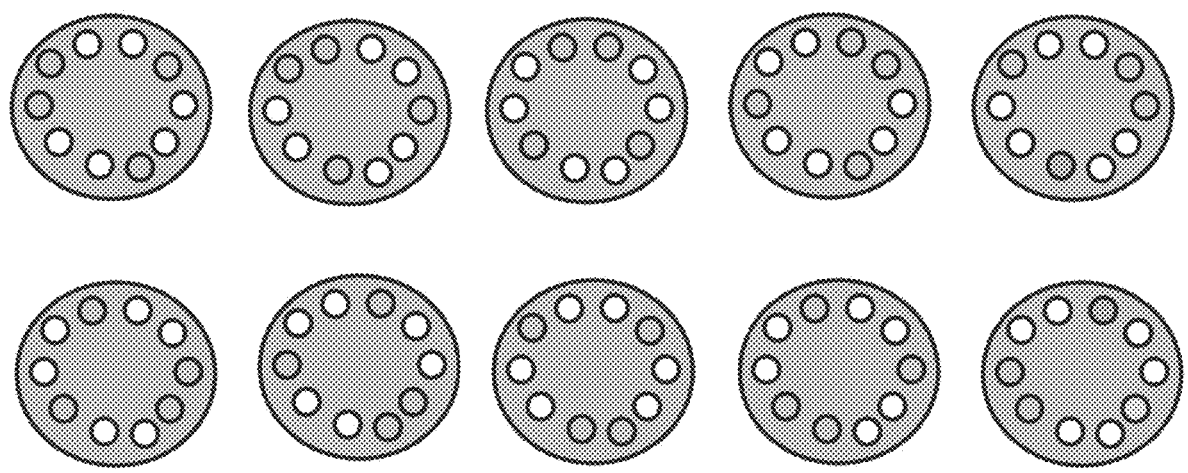

FIG. 14 Ten Different Piston Jet States

This figure shows a configuration of two discs comprising of three pairs of holes (tunnels). Each pair is comprised of tunnels that are matched to achieve jet collision as depicted in FIG. 13. The selection of 10 holes and three pairs of open holes, leads to ten distinct states of fluid flow through the piston. Each of the ten depicted states is associated with a different flow pattern. These 10 patterns then repeat at the same order. The change of flow pattern is determined by the speed in which the lower disc shift relative to the upper disc.

Figure 15:
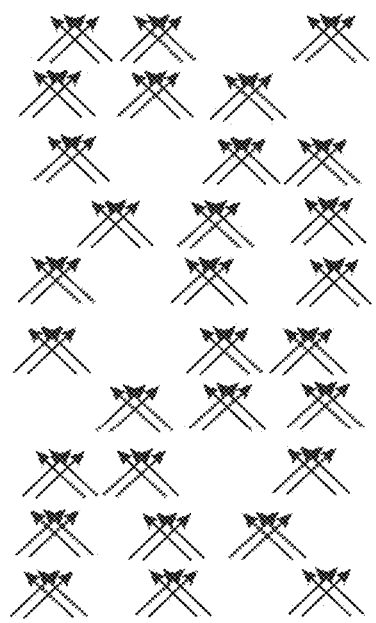

FIG. 15 Ten Different Mixing Regimen

The ten states of flow in FIG. 14 are depicted as 10 different configurations of colliding jets.

FIG. 16 Graduated (Entropic) Pump-Mixing

This figure shows three states of mixing effected through three states of flow openings on the mixing piston. The upper case shows a 50% hole area created through two large opening. This yields very poor mixing (low entropy). The two ingredients as shows are defined as big lumps of homogeneous blocks. In the middle case the same 50% or hole area is effected through 4 half size holes. This results in stronger mixing—higher entropy—smaller blocks of homogenous material. The bottom case depicts the same 50% of hole area but with a 8 quarter size holes in the piston (compared to 2 large holes in the upper case). This configuration results in a more intimate mixture of the ingredients, smaller homogenous blocks. The designer of the piston and the effective holes configuration will take into account whether the piston rotates or not (and at which speed), what speed does the piston move up and down. Etc. The designer can also change the percentage of flow are, it does not have to be 50% in particular. In a normal use as a reactor one is expected to wish maximum intimate mixing of the ingredients, but for other purposes, like entropic alphabet, a non-intimate degree of mixing may be desired, and will be achieved via a matching setting of the piston, its holes and movement.

Figure 17:
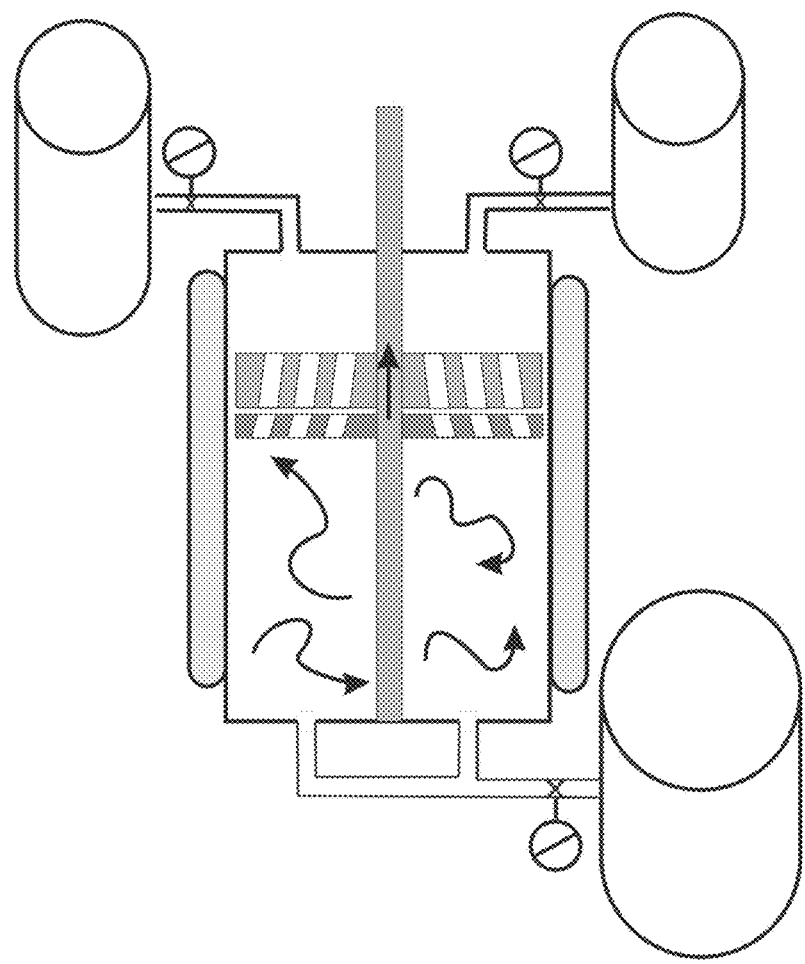

FIG. 17: PMH in a Non-atmospheric Pressure Environment

This figure shows the PMH within a pressurized compartment where the ingredients and the mixture are set in non atmospheric pressure. May be positive pressure, or may be some degree of vacuum.

Figure 18:
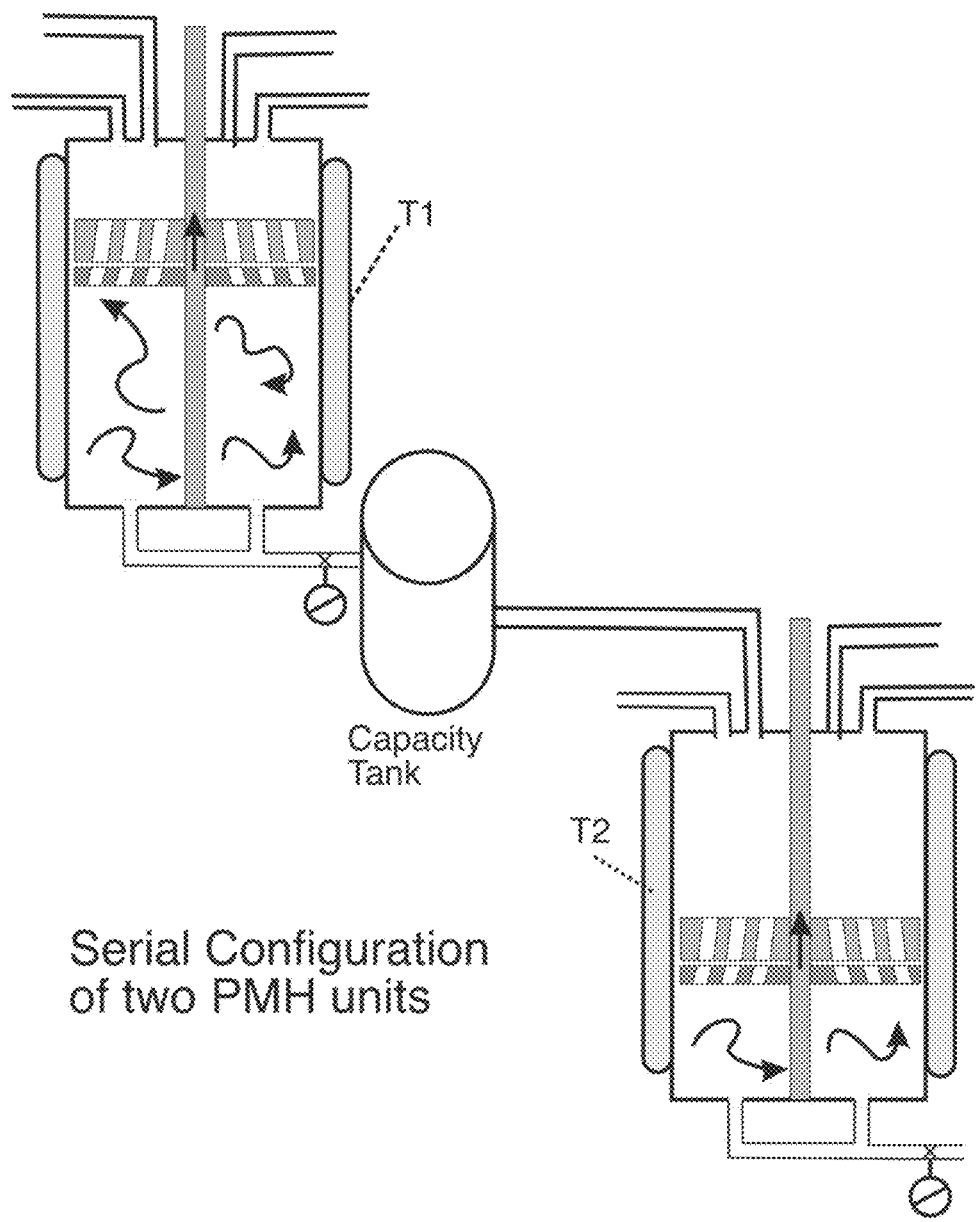

FIG. 18: Serial Configuration of Two PMH Units

This figure shows a configuration where a mixture from the upper cylinder becomes an ingredient in the second PMH unit. Each of the two cylinders may be fitted with its own heat exchanger, securing the temperature to a different reading in each unit. The two units are shown connected via a capacity tank so that they can operate each at their own pace and their own flow configuration.

Figure 19:
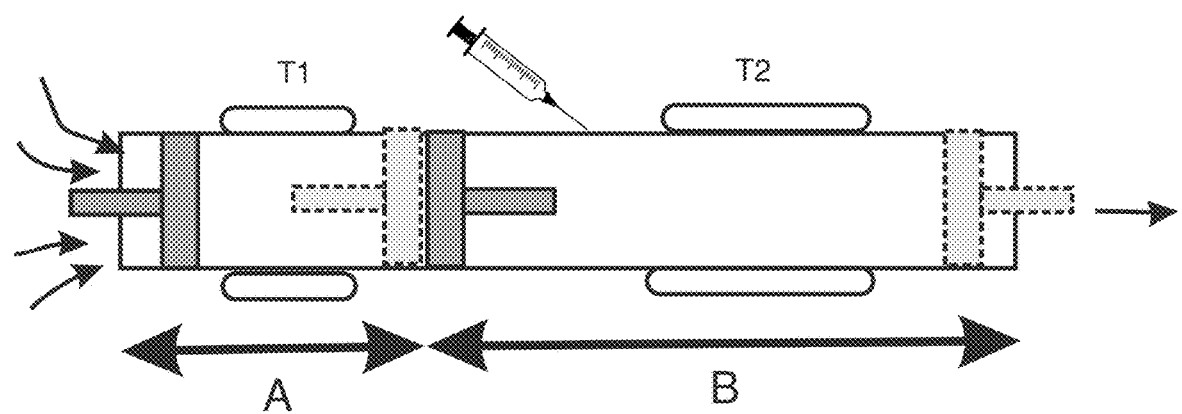

FIG. 19 Two Consecutive PMH Units Sharing a Cylinder

This figure shows a contraption where a single cylinder is shared by two piston. When the first (the left) piston operates the second (right) piston is stationed to block the flow and allow the leftmost part of the cylinder to have the quantum fluid in it mixed. This is done at temperature T1 per the dedicated heat exchanger. When the first part mixing is done, then the leftmost piston becomes the blocking piston, and the right piston moves right and left to generate the PMH effect. This rightmost part of the cylinder (B) operates with a dedicated heat exchanger securing the quantum of fluid at temperature T2. The rightmost part of the cylinder (B) is of larger size because, as the figure shows, another ingredient in injected into the mix.

Figure 20:
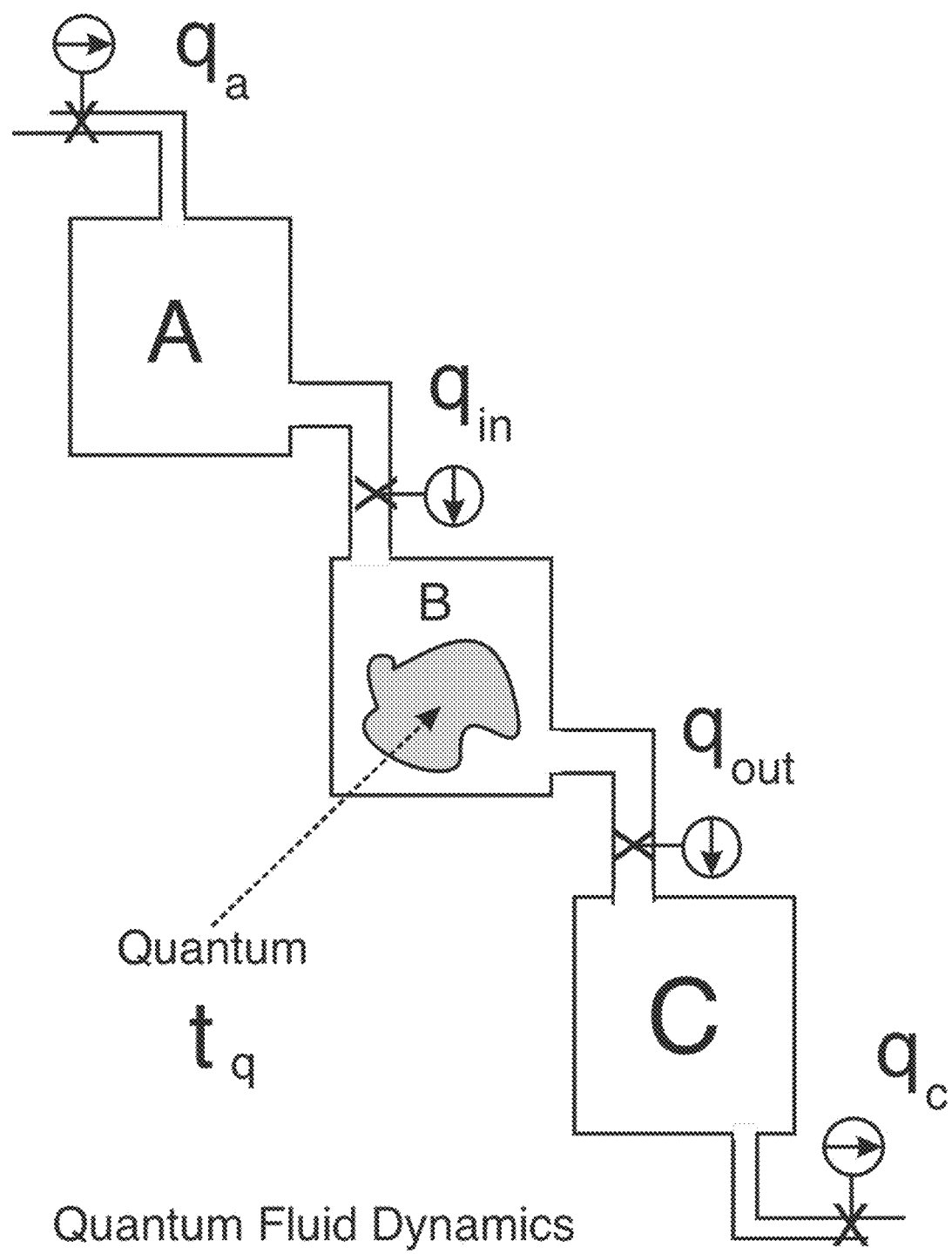

FIG. 20: Quantum Fluid Dynamics

This figure shows the fundamental configuration for quantum fluid operation. A continuous flow happens from to unit A from its predecessor unit, rate of flow is $q_a$. Unit C is a source of fluid coming out at a flow rate $q_c$, which is the same as $q_a$ ($q_c=q_a$). So that the entire process from before unit A to after unit C looks as a perfect continuous flow at rate $q_a=q_c$.

However, the flow from unit A to unit B is at a higher rate $q_{in}$ ($q_a \ll q_{in}$), it takes time in measure $t_{in}$ to move a quantity Q from unit A to B, so one writes:

$$Q = q_{in} * t_{in}$$

The quantity Q of fluid, is then treated as a batch element for a time $t_q$, and after that Q is pushed to unit C at flow rate $q_{out}$, over time in the measure of $t_{out}$. So once writes:

$$Q = q_{in} * t_{in} = q_{out} * t_{out}$$

If now one sets the values of $q_a$ and $q_c$ to comply with the following equation then one achieved the flow regimen of quantum fluid operation:

$$q_a * (t_{in} + t_q + t_{out}) = q_c * (t_{in} + t_q + t_{out}) = Q$$

This is under the assumption that the pumping of fluid to unit B and the pumping out fluid from B are done sequentially. If they are done simultaneously then let $t_{max}$ be the highest level between $t_{in}$ and $t_{out}$:

$$t_{max} = MAX(t_{in}, t_{out})$$

then one writes:

$$q_a * (t_q + t_{max}) = q_c * (t_q + t_{max}) = Q$$

Illustration. Let an industrial chemical flow line operate at rate of $q_a = a_3 = 1000$ liter/day. One wishes to apply the quantum fluid operation (QFO) on this line, such that a quantum of fluid is focused for a treatment of 2.5 minutes. At first cut we assume: $t_{max} \ll t_q$, so we can approximate $t_{max} = 0$. Next we assume that the industrial production line operates 24 hours a day. We thus calculate the flow rate on the line to be: 1000/24=42 lit/hour. We can not calculate the quantity of captured fluid Q as: $Q = q_a * t_q = 42 * (2.5/60) = 1.75$ liter.

If one wishes to capture the quantum of 1.75 liter in a cylinder of length l=60 cm, then one would calculate the diameter d of the cylinder to be:

$$d = SQRT(4Q/(l*\pi)) = 4*1750/(60*3.14)) = 6 \text{ cm}.$$

We conclude then that for production line of capacity of 1000 liter/day a PMH operation where the quantum of fluid is subject to focused treatment lasting 2.5 minutes, and where the PMH is applied to a pump-mixer-heat exchanger then the respective cylinder will have the capacity of 1.75 liter, and if one wishes to construct the cylinder with a length of l=60 cm, then the diameter of that PMH cylinder will be 6 cm. This will lead to a piston of diameter of 6 cm, sufficient size to drill a dozen holes of about 1 cm diameter.

Figure 21:
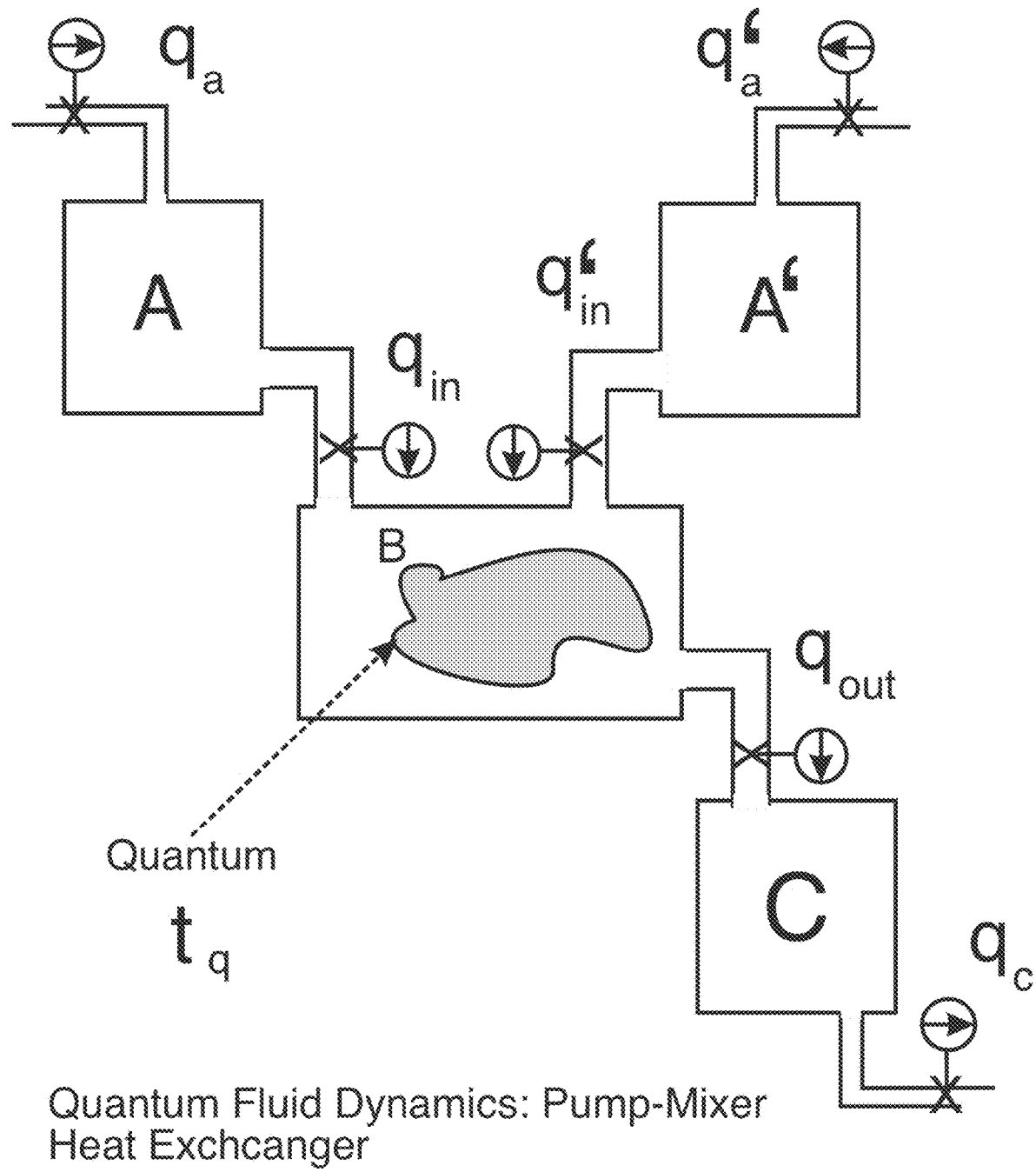

FIG. 21 Quantum Fluid Dynamics: Pump-Mixer-Heat Exchanger

This figure expands on FIG. 20, with the difference of having two feed line $q_a$ and $q'_a$. This modifies the dynamic equations as follows:

$$Q = q_{in} * t_{in} + q''_{in} * t_{in}$$

and no change for:

$$Q = q_{out} * t_{out}$$

We can also write:

$$q_a * (t_{in} + t_q + t_{out}) + q'_a * (t'_{in} + t_q + t_{out}) = q_c * (t_{in} + t_q + t_{out}) = Q$$

Illustration: a production line is scheduled to manufacture 5000 liter/day of a finished product. The line includes a reactor that blends two ingredient to be reacted to the final product. A PMH solution is being considered. The treated quantum will need to be treated for 5 minutes. It takes 30 seconds to pump the quantum into the PMH until, and the same time to pump it out.

The proportions of the blended (mixed) ingredients is 3:1 volume wise.

Accordingly per the symbols above, we have $q_a=(5000/24)*(75/100)=156$ lit/hr, and $q'_a=(5000/24)*(25/100)=52$ lit/hr. Assuming the line is active 24 hours a day.

The volume of the quantum fluid is calculated to be:

$$156*(5+0.5)/60+52*(5+0.5)=19 \text{ litter.}$$

The designers of the PMH unit for this reaction have concluded that optimized dimensions for the cylinder will be a diameter of 10 cm, and a length of 90 cm. This translates to a quantum volume, Q of:

$$Q=\pi*(10^2/4)*90=7065 \text{ ml}=7,065 \text{ litter.}$$

Based on the above calculations the production line can be set up with three optimized size PMH units of total volume of 7.065 liter*3=21.195 litter, featuring some extra volume over the 19 litter minimum required to keep the line working at the intended flow rate.

The cylinder designers may have concluded that the most effective speed for the piston is 10 cm/sec. Therefore a single swing of the piston from one side of the cylinder to the next will take (90 cm)/(10 cm/sec)=9 seconds. One can add 1 sec needed for the piston to rest before reversing direction, and therefore the time lapse for a single swing is 10 seconds. The PMH unit handles the quantum of fluid for 5 minutes, therefore the piston will swing inside the cylinder (5*60 sec)/10 sec=30 swings, or 15 full cycles for mixing and reacting before displacing the captured fluid quantum to the next stage in the continuous line. (see FIG. 22)

Figure 22:
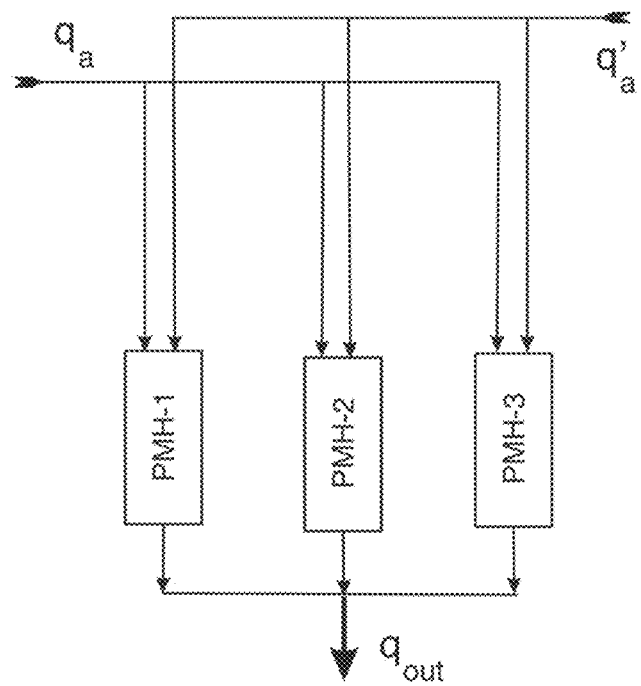

FIG. 22: Array of Two ingredients and Three PMH Units

This figure depicts the illustration featured in the explanation for FIG. 21. Two ingredients feed three PMH units that operate in parallel and their output is assembled before sending it off to the next unit in the manufacturing line. Such an array allows its user to stick with the optimal dimensions for the PMH unit and simply set up enough of those optimal PMH units to work in parallel so that they act line a single PMH with cylinder of size equal to the sum volumes of the used PMH cylinders.

Figure 23:
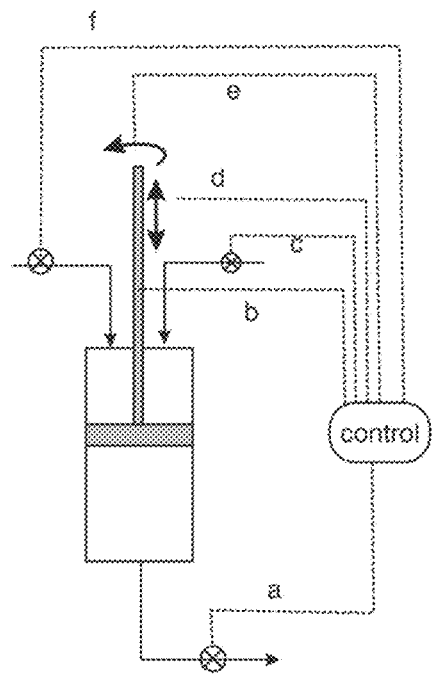

FIG. 23 PMH Basic Control Diagram

This figure shows the basic control points managed by the control program of the Pump-Mixture-Heat Exchanger. (PMH). This is a forward control scheme. Line a indicates control of the outlet valve; line b indicates control of "open"/"closed" states of the piston; Line c indicates the control of the valve of one of the two ingredients feeding into the PMH unit; line d indicates control of the shaft/piston movement inside the PMH cylinder. Line e represents the control of the rotation of the piston inside the cylinder, and line f represents control of the other ingredient that feeds into the PMH. If a heat exchanger is involved then its flow is also controlled by the PMH controller. The depicted PMH is without feedback data. If such data is measured and it feeds back to the controller then the control scheme becomes feedback style, not forward.

Figure 24:
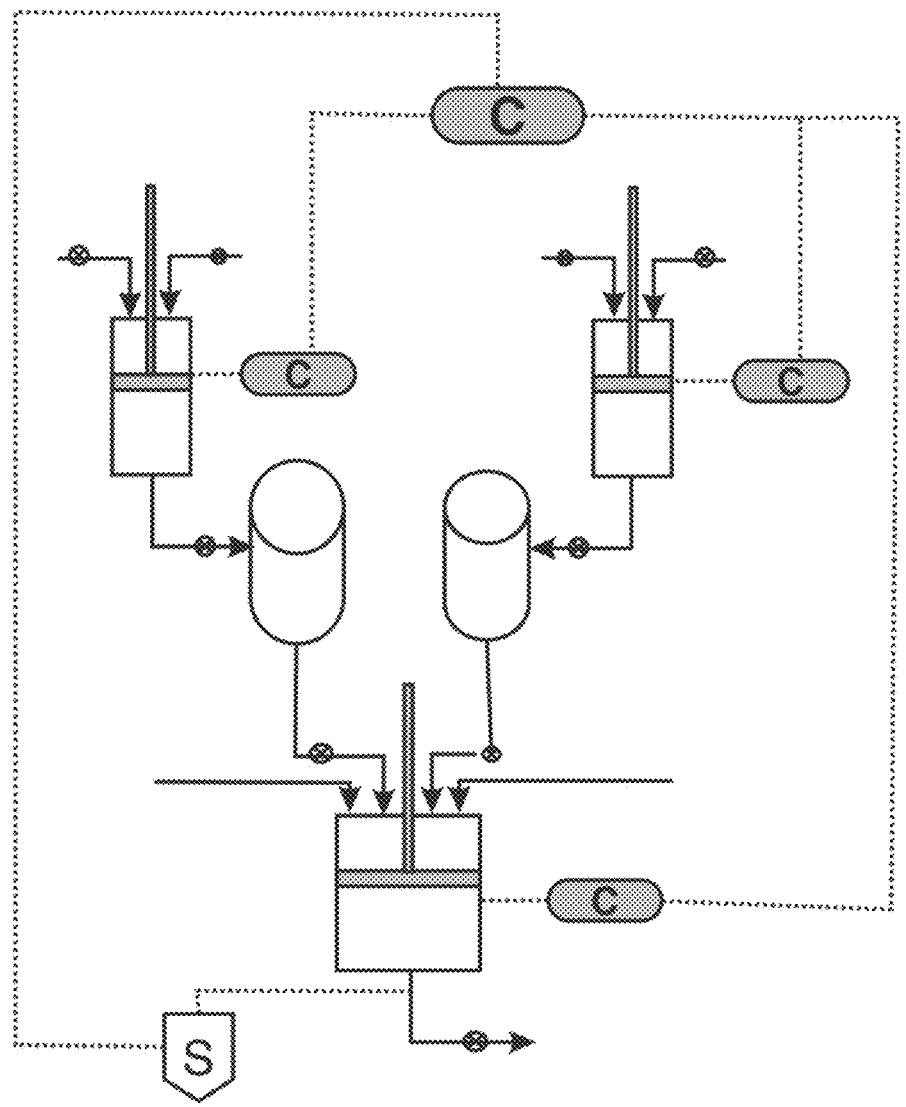

FIG. 24 PMH Array Control

This figure shows a particular PMH array comprising three PMH units. Each PMH unit has its own controller as depicted in FIG. 23, but the set points for these three PMH controller is determined by a higher up control system marked as C. The higher up array controller. This array controller operates on a feedback basis. The bottom PMH has a sample bottle, which is analyzed inside this bottle (chamber) for parameters of reliance, and the results are fed back to the array controller. The figure also shows two capacity tanks leading from the two upper PMH unit to the bottom one. These tanks may be equipped with level gauger which may also be fed into the array controller.

Figure 25:
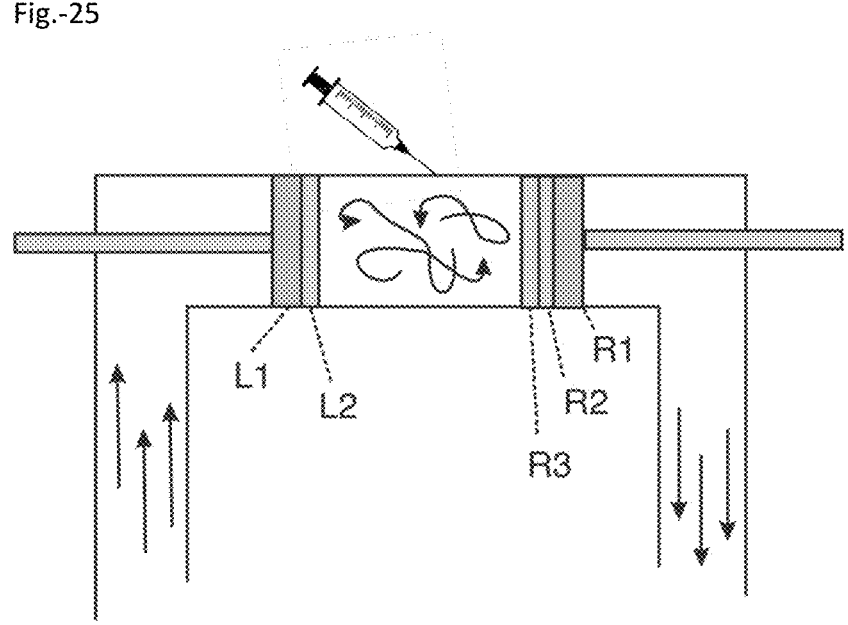

FIG. 25: Precise Injection Application

This figure depicts an implementation of PMH internally in a pipeline. The PMH container (cylinder) is part of the pipeline, no special construction. The pipeline bends 90 degrees on both ends of the PMH cylinder section, so as to allow for two shafts to be fitted through the pipeline. The two shafts enclose an section of the pipeline serving as the PMH. The figure shows the fluid streaming through the pipe. The PMH protocol of switching pistons between "open" and "closed" states and moving the pistons inside the cylinder defines a quantum of fluid inside the pipe captured in the cylinder section. Into that section one injects an additive to the fluid, as shown. The pistons are moving back and forth to insure effective mixture between the additive and the main flow fluid. The mixture is also precise because the additive amount is carefully measured, and the quantity of the captured quantum of fluid is precise—the volume between the pistons. In total the PMH injection offers a simple elegant way to achieve precise and efficient injection mix.

Figure 26:
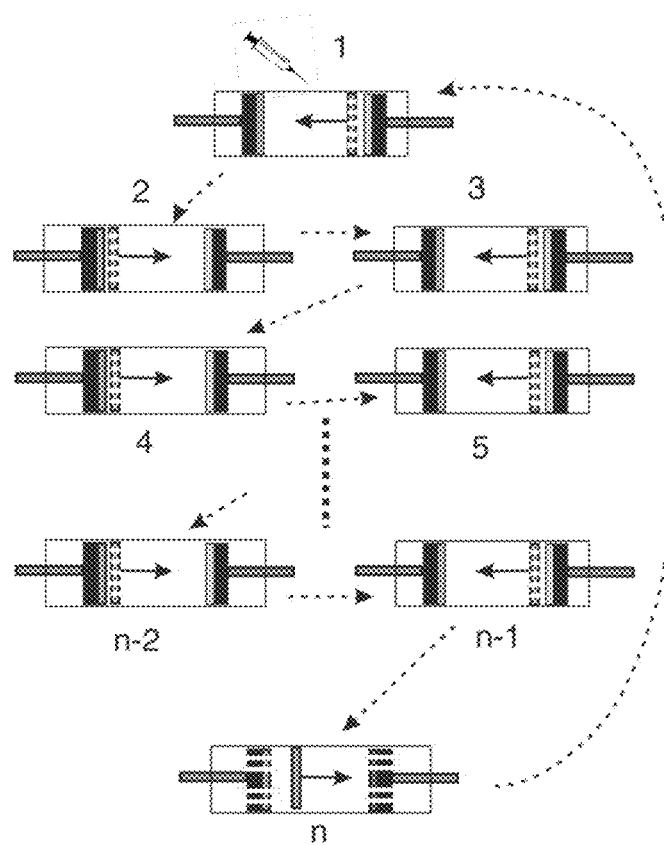

FIG. 26: Precise Injection Sequence

This figure shows the injection-mixing protocol applicable to the contraption depicted in FIG. 25. It starts at the top, (1), where the cylinder section of the pipeline is subject to injection of an additive. The figure then shows that the inner piston on the right side is then disengaging from the two pistons it was abreast to. The two discs (pistons) on the right are stationary and are aligned so as to lock the holes not to allow the captured fluid to escape. So when the internal right side piston is moving towards the internal left side piston it creates the mixing effect between the main flow fluid and the injected additive. The figure then shows an arrow pointing to the next state (up left), (2), where the internal right side piston arrived at a touching position with the left side internal piston. All the while, from the beginning of this sequence the two external pistons both on the right and on the left of the cylinder have been aligned so as to capture and bound the quantum of fluid inside the pipe. So when the mixing piston moved across the captured quantum, the fluid had no alternative except to flow through the openings of the moving piston. The same internal right side piston, is now moving back in the cylinder (2). When it arrives to be breast of the two stationary discs on the right (3), it travels back to the left, to step (4). The figure shows that this back and forth travel of the piston in the "open" state is happening as many times as needed to achieve the desired state of the quantum fluid. At step (n−1) the moving piston is traveling one more time from right to left and is stationed abreast of the two stationary discs at the left side of the cylinder. Since by then the quantum fluid is at the desired state, it is now time to push it out from the cylinder, and pull in the next quantum to be subjugated to the same operation. To do this both pairs of discs on the right and the left side of the cylinder are realigned such that holes are exposed in both pair. By contrast the moving piston is now aligned to "closed" position. So when in step (n) the moving piston in the "closed" position is moving from left to right, it does two things: (i) it pushes out the treated quantum fluid to what comes next in the processing line, and it pulls, suctions in the next quantum fluid from the feeding source of the fluid. When the moving piston arrives to the abreast position with the two stationary discs on the right, then it returns to stage (1) in the figure. The moving piston returns to "closed" position and the two pairs of discs are both aligned to "closed" position. The additive is injected and the cycle described above repeats itself. Thereby the precising mixing and reacting if necessary, happens within the pipeline that exhibits a continuous flow from the outside. Note:

the moving piston may be a single piston with internal discs to switch from "open" to "closed" position, or it may be a combined pair of discs (not shown in the figure) like the pair of discs at both ends of the cylinder.

Figure 27:
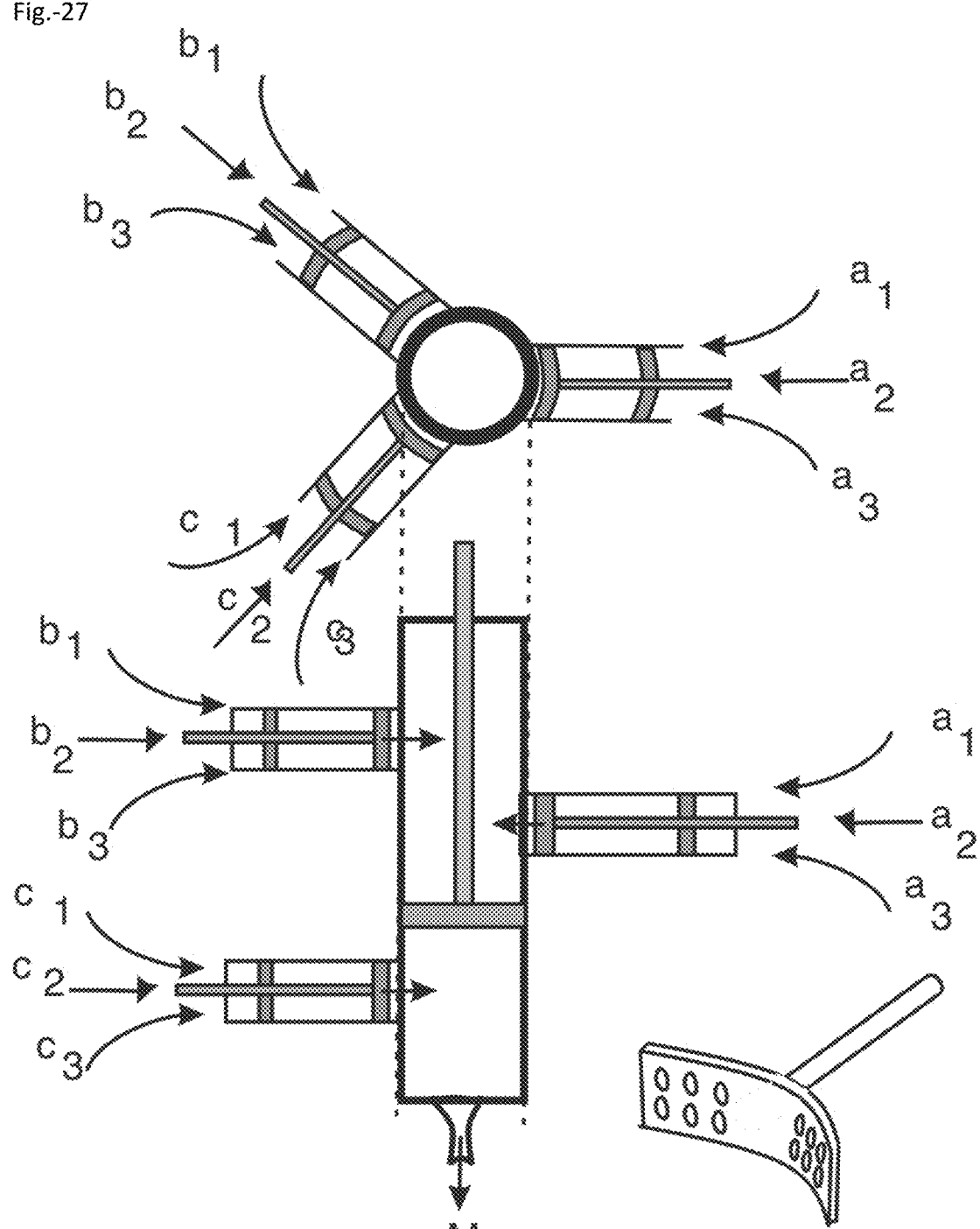

FIG. 27: Integrated Quantum Fluid Operation

This figure shows a complex constructed from QFO apparatus. A main cylinder that serves as the container for a fluid quantum (vertical) is fed from three sources. The three sources are attached to the walls of the cylinder. They are QFO apparatuses themselves. Because they attach to the cylinder wall, they are built not as regular flat circle faces for their pistons but rather curved adjusted to fit the wall of the cylinder, as shown in the right bottom of the figure. The figure shows two cast views of the apparatus, from above and from the side. The first feeding QFO apparatus mixes ingredients $a_1$, $a_2$, $a_3$. The mixture of these ingredients is fed into the vertical QFO apparatus. The same happens with the other two QFO apparatuses. One mixes ingredient $b_1$, $b_2$, $b_3$ and the other ingredient $c_1$, $c_2$, $c_3$. Each of the feeding QFO apparatuses may operate over different time expanses, at different temperatures. The heat exchangers (not shown) for each QFO apparatuses can adjust the temperature each mixture to attain maximum efficiency for the reaction that is supposed to take place. The timing of pumping the three mixture to the vertical cylinder has to be coordinated with the movement of the piston of the vertical cylinder so as to achieve the desired mixing and reacting. That is the role of the combined controller of the QFO complex.

Figure 28:
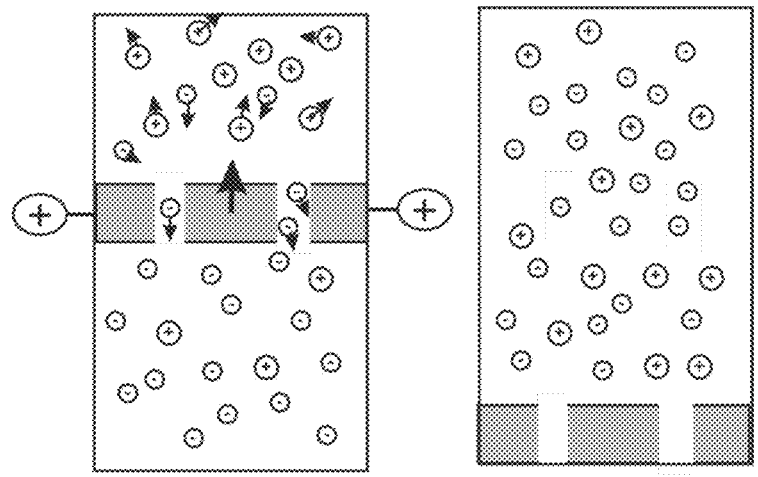

FIG. 28: Electric Charged Quantum Separation

This figure shows the use of the moving QFO piston as a means of separating parts of a fluid quantum based on electrical charges. It shows on the right side a cylinder full with a fluid comprised of negatively charged parts and positively charged parts. The piston is subject to a positive charge and then is moved up. It attracts the negatively charged parts to the piston. As these parts develop momentum towards the piston some of them are pushed into the holes and emerge on the other side, the behind-volume of the quantum. Positively charged parts are running away from the positively charged pistons. As a result when the piston arrives somewhere in the middle of the cylinder then the roughly behind-volume is richer with negative parts and the above-piston volume (the ahead volume) is richer with positive parts. By stopping the piston before it reaches the end of the cylinder one achieves separation of electrophoresis style, based on electrical charges. Next the ahead-volume has to be routed one way and the behind-volume has to be routed another way. Both parts may be subject to another operation of similar nature, in order to achieve another step of separation. This will lead to a cascade designed to achieve the desired degree of separation. The optimal stopping point for the piston depends on the ratio between the two ingredients that are to be separated.

Figure 29:
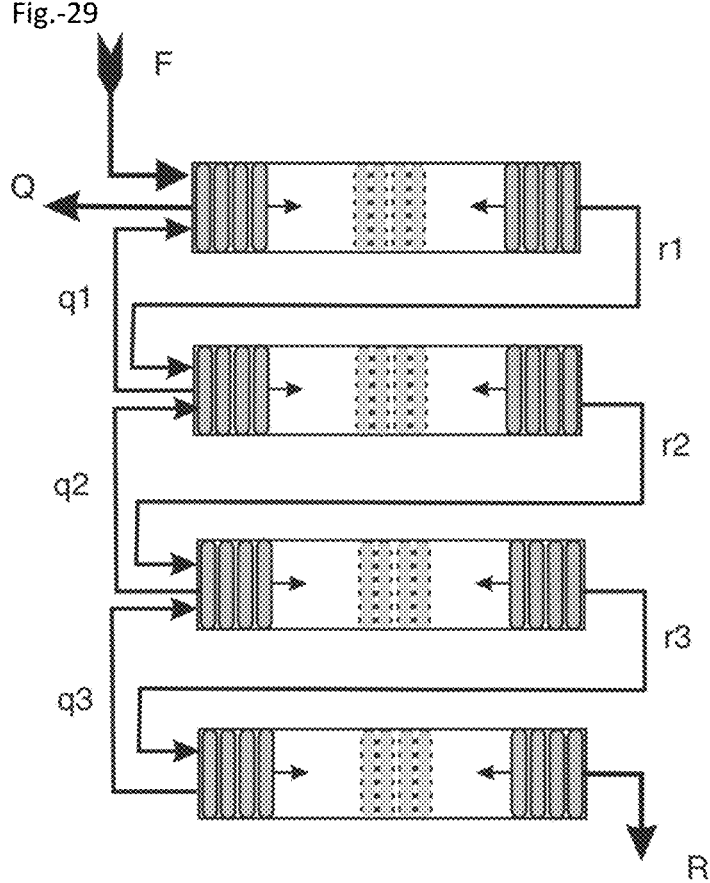

FIG. 29 Quantum Fluid Separation Cascade

This figure shows a cascade of QFO apparatus in a particular setting. The cascade is fitted with a source fluid F from above. The F fluid is pumped into the QFO cylinder. When done then the two internal discs (pistons) from the right are moving all the way to the middle (or about the middle point) of the cylinder. This movement generates a separation of the quantum fluid between the part of the quantum that is trapped behind the pistons and the part that is trapped ahead of the piston. One now needs to separate these two parts. To accomplish this separation. The two internal pistons from the left side of the cylinder are moving to the center, to be abreast the two pistons that came to the middle from the left side. Both sets of pistons from the right and from the left are moving to the middle point of the cylinder in a state "open". Once the two sets of pistons are abreast, the following happens. The two sets of pistons are changed to "closed" position. The left pair of piston is moving first, back to the left side of the cylinder (in state "closed"). As this happens the stationary pair of discs at the left side of the cylinder is switching itself to open (after the F line filled the cylinder the left stationary pair is switching from "open" state to "closed" state. The right pair of pistons is kept "closed" when the F line is filling the cylinder). As the left pair of moving pistons is moving back to the left side of the cylinder and the stationary left side pair is "opened" the volume between the middle point and the left side is pushed out of the cylinder (line Q). When it is all pushed out. The moving left pair remains in "closed" state and is moving back to the right. By so moving it pulls in another quantum of fluid from redline F. The left side pair of moving pistons stops when it touches the right side moving pistons. While the left side moving pair is pushing the left side of the quantum out through Q, the right side pair of pistons may optionally be closed, and thereby a vacuum is created between the two sets of moving pistons, or it may stay open so that the behind part of the quantum can flow through the holes towards the left side pair of pistons moving to the left. When the left side pair of pistons returns to the middle point in both cases the behind volume of the quantum is captivated between the right side pair of pistons and the right side of the cylinder. So when the right side pair of pistons is in "closed" state the behind volume of the quantum of pushed through line r1 to the next element in the cascade.

As shown in the next element of the cascade r1 takes the role of F in the first element. The operation in the second and in all subsequent elements of the cascade is similar. r2 takes the role of r1 in the first element, etc. The left side output of the second element is not routed into the Q outlet as it was done in the first element. Rather it is routed as feed into the first element, that means that F is feeding only about half of the volume of the quantum. Similarly q2 feeds into element 2. This cascade mimics the trays used in a distillation tower and similar cascading operation. At the end of the separation cascades the highly separated fluid is routed as the R route. So in summary fluid comes in though line F, and is separated to two streams each containing a predominant fraction of the opposite ingredients. The separation lines are Q and R.

Figure 30:
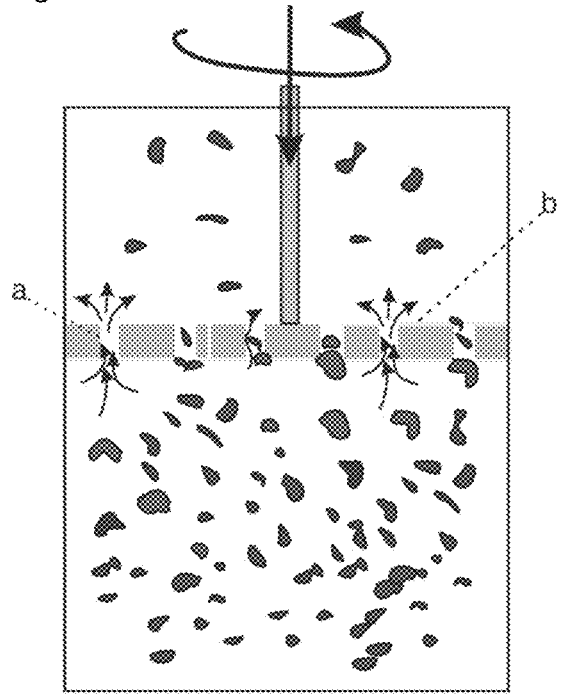

FIG. 30 Slurry/Suspension CFO Separation

This figure shows a QFO piston being pushed down through a slurry and suspension, while in the "open" state. The solid particles tend to pile up and clog the flow through holes, while the liquid proper will flow more efficiently through the holes in the piston. In a regular operation the holes may be all get clogged and stop the piston. This will be prevented by allowing the piston to rotate and thereby re-expose the holes from being clogged. The effect then is that the behind-volume of the quantum has less slurry particles in it. And when the piston is stopped at about the mid point of the cylinder, it identifies two parts of the quantum with a distinct difference of particles content—a separation step. Several similar units may be linked into a cascade to effect a desired level of separation.

Figure 31:
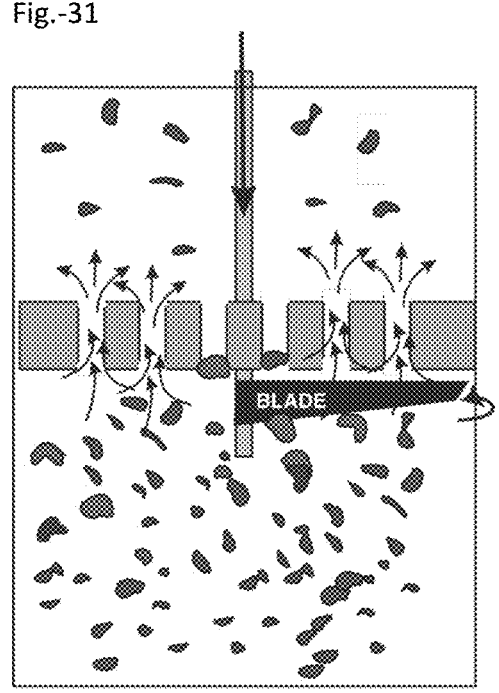

FIG. 31 Rotating Scraping Blade in QFO

This figure depicts a rotating blade scraping the moving surface of a QFO piston to remove pilings of slurry particles that clog piston holes. The rotating blade insure that holes are not clogged, flow occur, and the clear liquid shows priority and more efficient flow through, which achieved separation.

Figure 32:
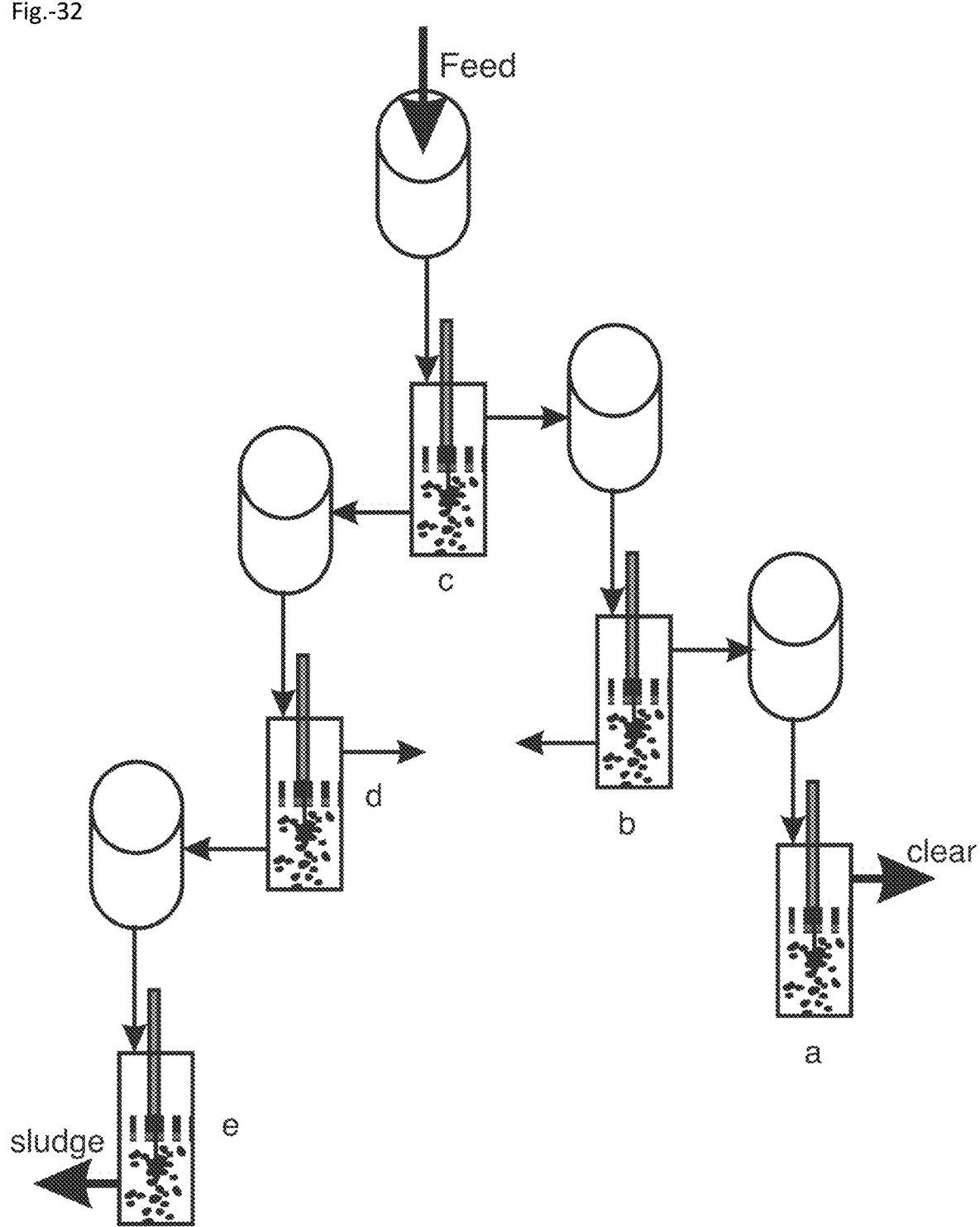

FIG. 32 Slurry Clearing QFO Cascade

This figure shows an assembly of slurry separation units, which are connected through capacity tanks so as to allow each QFO unit to operate in its own pace. The cascade achieves the desired separation of the slurry from the liquid.

Figure 33:
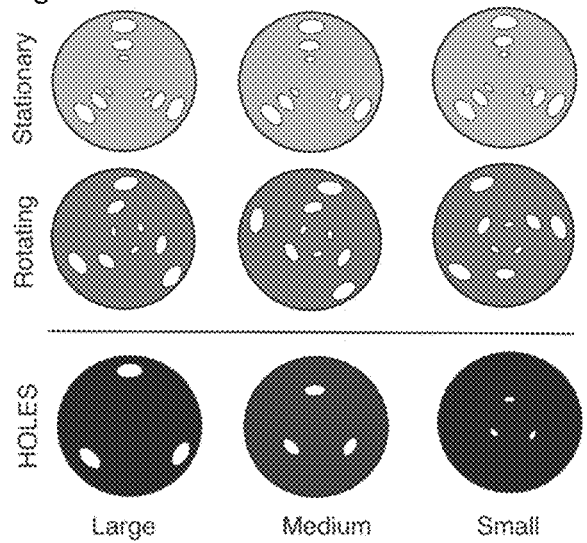

FIG. 33 Hole Size Adjustment

This figure shows three different configurations of a pair of QFO pistons. In each configuration a different size of piston holes is affected. There are three more relative states of the discs where no hole is present, the piston is in a "closed" state. The geometry of the holes in both the stationary and the rotating discs clearly show how one can align the discs to effect large medium or small holes. There could be various similar configurations with many more holes.

Figure 34:
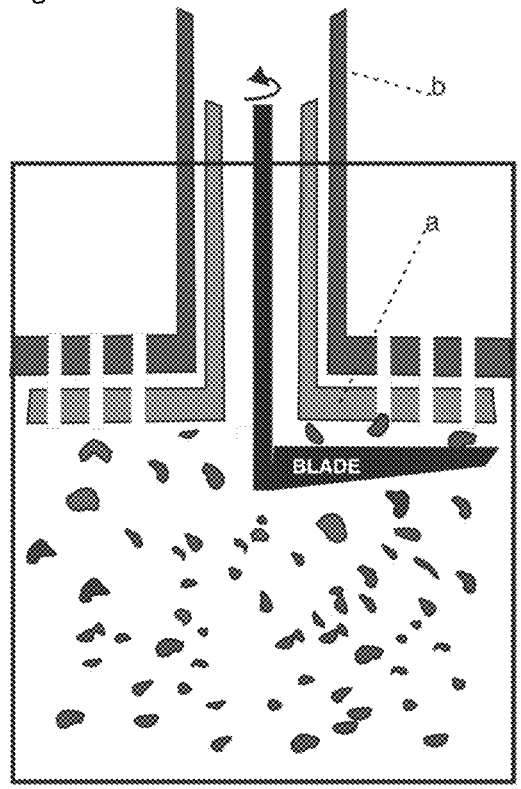

FIG. 34 Slurry Clearing QFO Apparatus

This figure shows how a co-axial construction allows for a rotating blade and two discs piston to operate such that the blade rotates at its own speed, and the two discs rotate at their own speed, while the two discs align themselves to adjust the flow through for the QFO piston.

Figure 35:
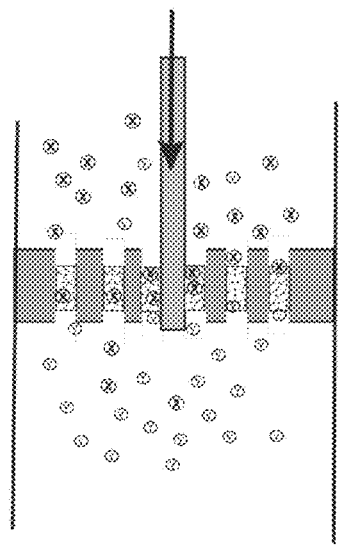

FIG. 35 QFO Gas Chromatography

The figure shows a QFO piston moving downward where its holes are staffed with chromatographic substance, (or alternatively a membrane) which shows affinity difference to between two fluid constituents X and Y. As the piston moves slowly, the volume-behind is getting richer with constituent X and the volume ahead is getting richer with constituent Y. It is important to optimize the thickness and mass of the chromatographic separator in the piston holes, to adjust respectively the speed of the piston, and decide optimally on the best point to stop the piston and dislodge the two parts of the quantum to different receptacles.

Figure 36:
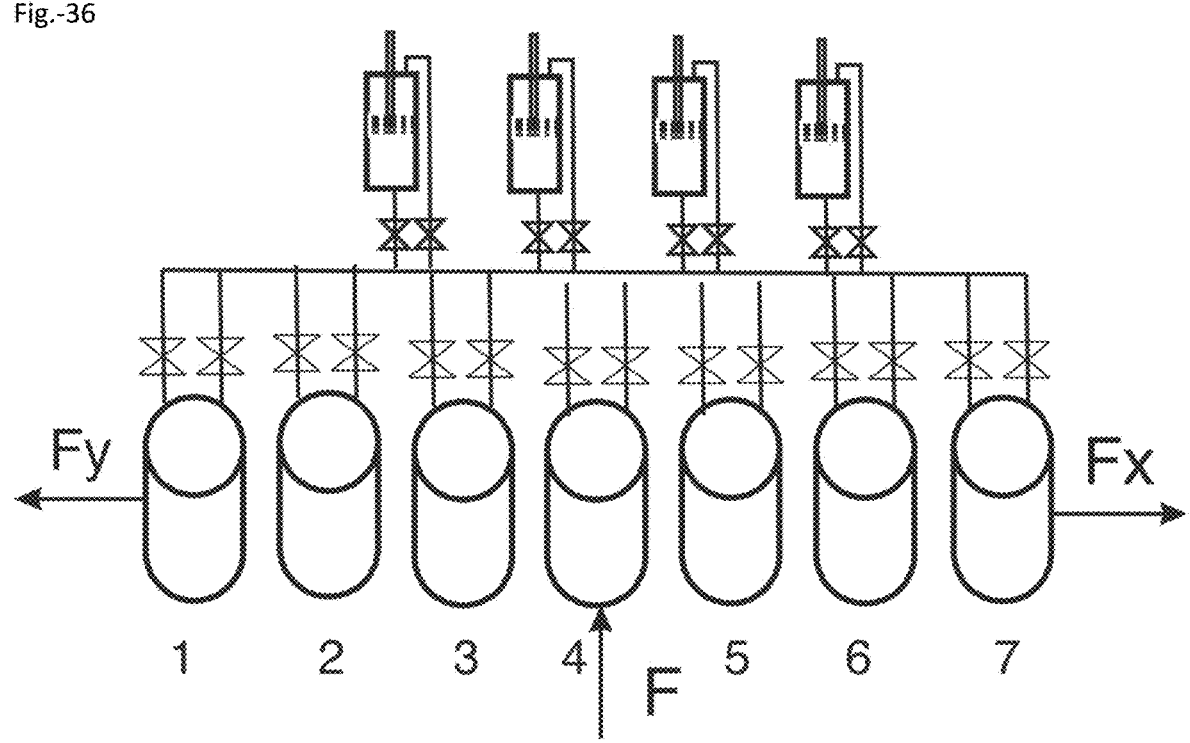

FIG. 36: QFO Frequency Separation Strategy

This figure shows a QFO frequency separation strategy. 7 capacity tanks are depicted. The raw feed F enters into the middle tank (4). The feed is a mixture of constituents X and Y. The rightmost tank (7) is where the X-rich fluid is accumulated ($F_x$) and the leftmost tank (1) is where the Y-rich fluid is accumulated, ($F_y$). A pipeline system connects all the capacity tanks with each of the QFO apparatuses that are part of the combined system. The pipeline array allows each QFO unit to take feed from any capacity tank and drain its contents to any capacity too. The strategy is based on the situation where any of the QFO units is suctioning a quantum Q of fluid from capacity tank 4. This quantum is separated in that QFO unit to an X-richer half, $Q_x$, and a Y richer part, $Q_y$. $Q_x$ is routed to capacity tank 5 and $Q_y$ is routed to capacity tank 3. The quantities of $Q_x$ and $Q_y$ are half the quantity of Q. In parallel to the above another QFO unit took in another quantum Q from tank 4, and effected a similar separation, routing its output also to tanks 3 and 5 respectively. As a result from these two operations, both tanks 3 and tank 5 now contain a full Q amount of fluid. Any free QFO unit will take in the fluid from tank 5, and separate it to a more X-enriched half, to be routed to tank 6, and to a more Y-enriched half to be routed to tank 4. This protocol is applied over and over again. As soon as a capacity tank is loaded with an amount Q of fluid, it is suctioned in from any free QFO unit and separated to two halves one richer in X and the other richer in Y. The X-richer half is routed to a capacity tank to the right of the tank where Q came from, and the Y-richer half is routed to a capacity tank to the left of the tank where Q came from. It takes two filling sessions to accumulate a Q amount in tanks 3 and 5; it takes 4 filling sessions to accumulate a Q amount of fluid in tanks 6 and 2, and it takes 8 filling sessions to accumulate a Q amount of fluid in tanks 7 and 1. This sequence will continue in case there are more capacity tanks. This frequency gap is the reason that a smaller number of QFO units can handle a large number of capacity tanks. Tank 1 is then drained to claim the Y-richer part of the feed, ($F_y$), and tank 7 is drained to take the X-richer part of the feed ($F_x$). The cut is nominally to halves, but it can be other than halves too. This strategy bears similarity to the continuous flow separation the way it happens in a distillation tower, only that the this solution affords the advantages of focusing on a quantum fluid at a time.

Figure 37:
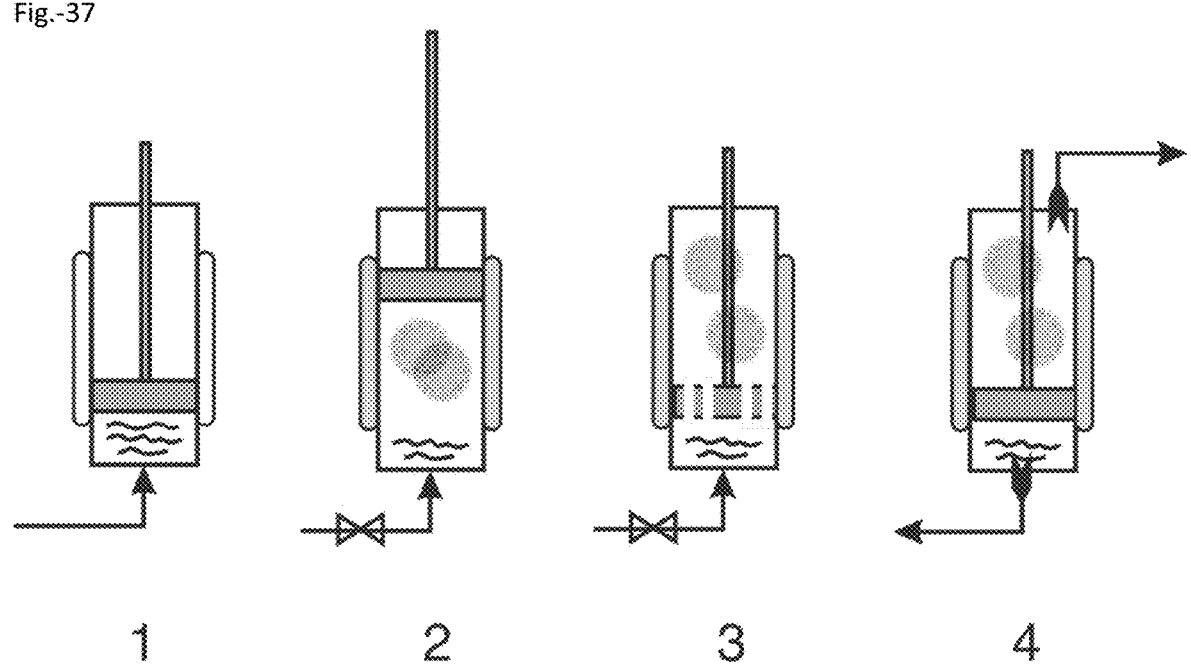

FIG. 37 QFO Distillation

This figure depicts the use of a QFO apparatus to accomplish a distillation separation. Stage 1 shows a feed of liquid to be distilled going right into the QFO cylinder. This happens when the piston in state "closed" is rising to suction in the feed. The piston stops at a planned point, such that the majority of the cylinder volume is above it. Next, as shown in stage 2, the feed is closed. The piston, still in "closed" state is now rising, and creating a vacuum above the liquid in the cylinder. This vacuum stimulates the liquid to increase its rate of evaporation. This rate is further increased with the help of an engulfing heat exchanger, as shown. When the piston reaches the top of the cylinder, there is much less liquid in the cylinder and the volume above the liquid is filled with evaporated gas phase which is richer in the more volatile constituents of the feed. Next, as shown in stage 3, the piston shifts from "closed" state to "open" state, and is moved back down until it is abreast with the surface of the fluid in the cylinder. Because the holes in the piston are open, the gas flow freely to accumulate above the piston. When the piston came down to touch the liquid, the two phases of the fluid are a separated above and below piston. The piston now shifts back to "closed" state (stage 4). It can now push down the liquid phase and push up the gaseous phase. The two outlets may go to a next QFO unit in a cascade as depicted in FIG. 36.

INTRODUCTION

Given three consecutive units in a typical chemical engineering facility: A, B, and C. The facility operates in steady state, and hence the level of the flowing fluid is fixed in each unit $l_a$, $l_b$, $l_c$, respectively. The average residence time of an arbitrary element of flowing fluid in the three units is $t_a$, $t_b$, $t_c$ respectively. The flow rate is r (kg/min).

We now propose to change the way unit B is handling the passing fluid. Rather that admit a continuous flow, one will pass in a block, a quantum of fluid of quantity Q from unit A, to unit B, and do so at time period $t_{in}$. Once unit B is in possession of the quantum of fluid Q, it will give it a dedicated treatment for a period of time $t_q$. During this $t_q$ period of time, the inlet from A to B will be closed. This will require A to be constructed as a capacity tank, since unit A is receiving fluid at a rate of $q_a$, while no fluid is passed on to unit B.

Once the treatment time of the quantum Q has passed ($t_q$) the quantum then pass the quantum fluid to unit C. This step takes $t_{out}$ time. Unit B will suction in another quantum of fluid, Q from unit A. This step may be done sequentially with pushing the former Q to C, or in parallel. The draining of unit B from Q will take $t_{out}$ time. During the Q treatment time, $t_q$, unit C will not receive fluid from unit B, but it will keep feeding fluid to its successor unit in the chemical production line. This requires unit C to be a capacity tank that can be drained a quantity Q before it is being filled up again from unit B.

This flow regimen will keep the production line flowing at rate of $q_a=q_c$, before unit A and after unit C. Unit A will lose an amount Q fast, at a rate $Q/t_1n$, and will be refilled at a rate of $t_q$. Unit B will suction in quantum Q fast, at a rage $Q/t_1n$, then treat the captured Q quantum for a longer period $t_q$, at the end of which it will dislodge Q to unit C at a rate of $Q/t_{out}$. Unit C will drain at a slow rate of $q_c$, and will receive after $t_q$ a fresh (treated) quantum of fluid, Q, which it will drain at the constant rate of $q_c$.

This change of fluid dynamics will change the level of fluid over time in units A and C, but will maintain the continuous flow regimen of the entire operation.

For a given value of flow rate ($q_a=q_c$) one can design a B unit large enough to keep the quantum Q in it for a time ($t_q$).

This quantum separation within a continuous flow is of advantage through its ability to focus on the quantum as needed.

The flow equations that describe this situation are:

1. for the case where unit B drains its quantum Q before it admits a new quantum in:

$$Q=q_a*(t_{in}+t_q+t_{out})=q_c*(t_{in}+t_q+t_{out})$$

2. for the case where unit B drains the treated quantum to unit C while suctioning the new quantum from unit A:

$$Q=q_a*(t_{max}+t_q)=q_c*(t_{max}+t_a)$$

where $t_{max}=MAX(t_{in}, t_{out})$ 3. for the case where $t_{max} \ll t_q$:

$$Q=q_a*t_q$$

A particular case for applying the quantum fluid process is over the classical stirred tank reactor. In the classical chemical reactor the mixing unit operation allows for a wide mixing range, way off the desired state. Modeling the behavior of fluid when a mixer rotates insides the reactor tank is quite an exacting task. Mixing quality also is fast deteriorating when viscosity goes up. The bulky shape of a reactor also makes it difficult to efficiently adjust the temperature of its contents. In particular a mixed reactor leaves corners and edge areas full of unmixed fluid not properly affected by the mixing blades. This situation raises the need for a mixer that would not leave any portions of the mixing-needed fluid behind. The other deficiency of the stirred tank is that residence time also varies greatly. Some fluid flows in and out right away, and other parts remain stuck in some corner for a much longer time. This greatly affects the efficiency of the reactor and the consistency of the product.

The classical way to move fluid in its entirety, not leaving anything behind is to capture fluid in a cylinder and push it through with a piston. This suggests the idea of using a piston movement to effect mixing. Using the Innovations$^{SP}$ methodology this investigation yielded the Pump-Mixer-Heat Exchanger unit (PMH).

The PumpMixture-Heat Exchanger Unit

The Pump-Mixture-Heat Exchanger (PMH) unit is comprised of the following parts:

1. quantum container cylinder apparatus 2. Pump-Mixer Piston 3. f Inlets and one outlet fitted on the cylinder apparatus. 4. Heat Exchanger (optional) 5. Controlled valve on all inlets and outlet 6. Computer control system to carry out the PMH operation The PMH has an operational protocol as follows:

1. The PMH unit suctions to the cylinder apparatus a quantity Q from unit A. The suction is accomplished by moving the piston from the edge of the cylinder where the f inlets are fitted, towards the opposite side of the cylinder. Quantity Q is comprising f ingredients: $a_1, a_2, \ldots a_f$, each ingredient $i=1, 2, \ldots f$ is of quantity $q(a_i)$, and:

$$Q=\Sigma q(a_i) \ldots \text{ for } i=1,2,\ldots f$$

2. The PMH runs a mixing operation on the captured quantity Q of fluid (takes $t_q$ time). While this mixing takes place, the f inlet lines are closed, and so is the outlet which is fitted at the opposite of the cylinder.

In order to accomplish the mixing operation the piston is transformed to become a plate with holes in it. When the piston returns to its starting position that quantum Q is forced to flow in the opposite direction. As the piston moves it also may rotate, so that in summary the fluid the is passed through the holes of the piston is getting mixed.

The piston will go back and forth several time for duration $t_q$ until the captured quantum Q is at the desired state, S.

3. In parallel to (2) the heat exchanger engulfing the cylinder is exchanging heat with the captured fluid (take $t_h \le t_q$ time to adjust the temperature of Q to the desired temperature $T_q$).

Step 3 is terminated when the piston is in its starting position, abreast with the f inlets. at the very end of the cylinder.

4. When step 3 is complete, the piston reverts back to its regular mode—no holes, so that when it is pushed to the other end of the cylinder, where the outlet is fitted it and the outlet is then opened, it causes all the captured quantum of fluid Q to be pushed outside the cylinder into the part of the line that lies beyond the cylinder.

5. Repeat steps (1) to (4) as long as the line is operational. This is the continuous operation protocol for the PMH.

Parts of the PMH

The Pump-Mixture-Heat Exchanger (PMH) unit is comprised of the following parts:

1. quantum container cylinder apparatus 2. Pump-Mixer Piston 3. Inlets and outlets fitted on the cylinder apparatus. 4. Heat Exchanger (optional) 5. Controlled valve on all inlets and outlet 6. Computer control system to carry out the PMH operation

Quantum Container Cylinder Apparatus

The quantum of fluid is captured in a cylinder container. The container will have one or more inlets and one or more outlets. The cylinder is surrounded by a sleeve of a double wall type where the heat exchange fluid is flowing. The cylinder is fitted with a piston that is free to move from one edge of the cylinder to the other. It is also fitted with electronics to control the movement of the piston inside.

The proportions of the cylinder, ratio between height and diameter may vary greatly dependent on the application.

Pump Mixer Piston

This piston is the key element of the PMH. It is built to allow it to move along the cylinder from edge to edge. The piston has two states: (i) open, and (ii) closed. When the piston is closed, it acts like a regular piston. When its starting position is at the upper edge (assuming the cylinder is placed vertical), and the inlets are fitted also at the upper edge of the cylinder, then, when the piston moves down it creates a vacuum that draws in fluid from the open inlets. The state of the valves on the various (f) inlets determines how much will be suctioned in from each ingredient. At the same time all fluid trapped between the piston and the lower edge of the cylinder (where the outlet is fitted) is pushed out of the cylinder via the one or more outlets, which are kept open. When the piston arrives at the lower edge it has pushed out of the cylinder all the fluid trapped in it before, and it fills the cylinder with new fluid drawn from the inlets. This then is a parallel action: draining the cylinder from the treated quantum of fluid in the cylinder, and drawing in a new quantum of fluid to be treated next.

Treatment of the new quantum of fluid begins by first changing the state of the piston from "closed" to "open".

When the piston is in the "open" state then it has slanted open "tunnels", (holes) across the surface of piston. When the piston makes its way back up to the top of the cylinder, then all the inlets and outlets are closed. When the piston moves up, the fluid trapped above it is forced down through the holes in the piston. The fluid simply has no where else to go. When the piston arrives at the top of the cylinder, all the fluid trapped in the cylinder has passed through the holes in the piston to the volume of the cylinder below the piston. Since the holes in the piston are slanted the various output steams are clashing one with the other by the their own momentum, and this creates a mixing effect. No part of the trapped (quantum) fluid is left unmixed, all the fluid passes through the holes in the pistons. The holes may also be straight (not slanted) to reduce the energy needs for moving the piston. This is a matter of optimization of the effort needed versus the results achieved. As the piston moves along the cylinder, it may also be subjected to rotation to further increase the mixing action.

Once the piston is up again, one of two things happens: (i) the first operation discussed above takes place, namely, the piston goes into its "closed" state, and a new quantum of fluid is suctioned into the cylinder, while the now mixed quantum is pushed out of the cylinder, or (ii) the piston remains in the "open" position and the piston travels down while all the inlets and outlets are closed and another round of mixing takes place. When so, then the piston goes back up, and mixing the trapped fluid once again. When the piston is again at the up position then once more, one of the two options mentioned above takes place.

We discuss ahead 1 implementation options for the open/closed state of the piston. 2. motion generation options for the piston 3. adding rotation to the piston movement. 4. motion and state control apparatus

Open/Closed Piston States (Implementation Options)

We discuss:
1. Internal Switching 2. Double Discs

Internal Switching

The will have holes drilled on its surface. It has a sufficient thickness, such that a thin and strong plat can be fitted such that it can swivel from being hidden inside the piston to be fitted just across the hole it is close to. The plate is operated by a simple controller which is controlled via local network (e.g. Bluetooth), or it may be pre-programmed in a feedforward mode.

Two Discs

The two discs solution features two discs, each is drilled with respective holes, such that the two discs can be aligned in two states. State 'open' when the holes in both discs are aligned, and state 'closed' when the two discs are aligned such that each disc blocks the holes in the other disc and as a result there is no open hole to allow fluid to pass through the piston.

A large variety of hole patterns between the two discs presents itself. This will lead to a variety of 'open state' configuration. Each state is characterized by different holes of different sizes, at different locations on the discs.

One embodiment calls for the outer disc to be hinged on a narrow rod that is fitted in a larger hollow rod, such that the narrow rod may be rotated back and forth and align the discs to "open" state and "closed" state.

Pump Mixer Piston

This piston is the key element of the PMH. It is built to allow it to move along the cylinder from edge to edge. The piston has two states: (i) open, and (ii) closed. When the piston is closed, it acts like a regular piston. When its starting position is at the upper edge (assuming the cylinder is placed vertical), and the inlets are fitted also at the upper edge of the cylinder, then, when the piston moves down it creates a vacuum that draws in fluid from the open inlets. The state of the valves on the various (f) inlets determines how much will be suctioned in from each ingredient. At the same time all fluid trapped between the piston and the lower edge of the cylinder (where the outlet is fitted) is pushed out of the cylinder via the one or more outlets, which are kept open. When the piston arrives at the lower edge it has pushed out of the cylinder all the fluid trapped in it before, and it fills the cylinder with new fluid drawn from the inlets. This then is a parallel action: draining the cylinder from the treated quantum of fluid in the cylinder, and drawing in a new quantum of fluid to be treated next.

Treatment of the new quantum of fluid begins by first changing the state of the piston from "closed" to "open".

When the piston is in the "open" state then it has slanted open "tunnels", (holes) across the surface of piston. When the piston makes its way back up to the top of the cylinder, then all the inlets and outlets are closed. When the piston moves up, the fluid trapped above it is forced down through the holes in the piston. The fluid simply has nowhere else to go. When the piston arrives at the top of the cylinder, all the fluid trapped in the cylinder has passed through the holes in the piston to the volume of the cylinder below the piston. Since the holes in the piston are slanted the various output steams are clashing one with the other by the their own momentum, and this creates a mixing effect. No part of the trapped (quantum) fluid is left unmixed, all the fluid passes through the holes in the pistons. The holes may also be straight (not slanted) to reduce the energy needs for moving the piston. This is a matter of optimization of the effort needed versus the results achieved. As the piston moves along the cylinder, it may also be subjected to rotation to further increase the mixing action.

Once the piston is up again, one of two things happens: (i) the first operation discussed above takes place, namely, the piston goes into its "closed" state, and a new quantum of fluid is suctioned into the cylinder, while the now mixed quantum is pushed out of the cylinder, or (ii) the piston remains in the "open" position and the piston travels down while all the inlets and outlets are closed and another round of mixing takes place. When so, then the piston goes back up, and mixing the trapped fluid once again. When the piston is again at the up position then once more, one of the two options mentioned above takes place.

We discuss ahead
1 implementation options for the open/closed state of the piston. 2. motion generation options for the piston 3. adding rotation to the piston movement. 4. motion and state control apparatus

Open/Closed Piston States (Implementation Options)

We discuss:
1. Internal Switching 2. Double Discs

Internal Switching

The will have holes drilled on its surface. It has a sufficient thickness, such that a thin and strong plat can be fitted such that it can swivel from being hidden inside the piston to be fitted just across the hole it is close to. The plate is operated by a simple controller which is controlled via local network (e.g. Bluetooth), or it may be pre-programmed in a feedforward mode.

Two Discs

The two discs solution features two discs, each is drilled with respective holes, such that the two discs can be aligned in two states. State 'open' when the holes in both discs are aligned, and state 'closed' when the two discs are aligned such that each disc blocks the holes in the other disc and as a result there is no open hole to allow fluid to pass through the piston.

A large variety of hole patterns between the two discs presents itself. This will lead to a variety of 'open state' configuration. Each state is characterized by different holes of different sizes, at different locations on the discs.

One embodiment calls for the outer disc to be hinged on a narrow rod that is fitted in a larger hollow rod, such that the narrow rod may be rotated back and forth and align the discs to "open" state and "closed" state.

Motion Generation Options for the Piston

There are many standard solutions for moving a shaft connected to a piston back and forth in a guarded rail, as provided by a cylinder. The source of power may be electrical, steam, combustion engine, hydraulics, or compressed air. The choice depends on the size and the other parameters of the PMH.

An alternative way to generate the motion of the piston is to connect it to a belt or a chain that rolls over two wheels at the two end of the contraption. The chain goes up and down, and is powered by an electric motor. The motor rotates an axis outside the cylinder, and the axis enters the cylinder through a well sealed opening.

Inlets and Outlets Fitted on the Cylinder Apparatus

The number of inlets may be equal to the number of ingredients to be mixed in the PumpMixer. Each inlet will be fitted with an electrically controlled valve that will either keep the inlet closed or keep it opened to the degree fitting the mixing ratio between this ingredients and the other ingredients.

The number of outlets may be one or more. The outlet is also fitted with a controlled valve that can be either in a "closed" state or in a fully "opened" state.

Heat Exchanger

The captured quantum of fluid, q, is focused on and treated over a period of time $t_q$. Over that time interval it is possible to move the entrance temperature of q from $T_e$ to the target temperature $T_q$. This can be done with a heat exchanger sleeved on the cylinder. The familiar double walls configuration will allow a source of heat or coldness to be flowing around the cylinder and exchange heat through the cylinder wall, so that $T_e \rightarrow T_q$.

The efficiency of the heat exchange depends on many parameters which are all degree of freedom for the designer: the area of heat exchange, the material of the cylinder's walls, the nature of the heat exchange fluid. Also, one might adjust the PMH protocol to move the captured quantum back and forth before dispatching it down stream. This will allow for more heat exchange time.

If one needs to raise the entrance temperature then electric heating pad to envelope the cylinder might be a worthy option.

Controlled Valves on all Inlets and Outlet

All inlets and outlets will be fitted with controlled valves. The outlet(s) will be fitted with an "on-off" valve, where electronic control will put it in either "open" state (fully open), or in "closed" state. The inlets will be fitted with a gradual flow valve so that they can be controlled to allow flow of each ingredient to build the right mixture balance.

PMH Control System

The PMH control system will execute an entered protocol and do the following:
1. Adjust the state of the piston and the corresponding states of the valves on the inlets and outlets lines. 2. Move the piston according to the dictates protocol 3. Operate the heat-exchanger, if any to bring the mixture temperature $T_e \rightarrow T_q$ The PMH control system may work in a feed-forward mode, or in a feedback mode. In the latter it may be based on measurements of the quantum of fluid. If the objective has been achieved, the protocol concludes, otherwise it continues.

In the feed-forward mode the PMH control will be based on prior experiments that established operational parameters which bring about the desired objective.

PMH Feedback Control Mode

Feedback control will work in two modes: (i) cylinder measurements, (ii) sample measurement.

Cylinder Measurements

In this mode the measurement is conducted via recessed sensors on the inner side of the cylinders. These can be temperature sensors, and they can be sensors used to determine the degree of mixing in the mixture. Such determination in some cases may be carried out via electrical resistance between two points on the cylinder, or through a source of electromagnetic radiation and a corresponding transducer for the remains of the beam after parts of it were absorbed by the mixed quantum.

By fitting a series of such sensors recessed into the inner walls of the cylinder, it is possible to quickly measure resistance between various pairs of sensors to check the consistence of the mixture.

The readings of those measurements will be feedback source to the computer program that manages the PMH, specifically it will decide whether the process is at the objective state, or whether more processing is needed.

Sample Measurements

In this mode, when the piston comes down and the outlet valve is off, one could open a side outlet leading to a sampling container where the mixture will accumulate and be subject to a battery of tests to generate feedback to the PMH control system. The sampling container will be emptied after every fill up.

PMH Operational Protocol

The PMH has an operational protocol as follows:
1. The PMH pumps out a quantity q of mixed fluid towards the downstream unit (takes $t_p$ time) 2. In parallel to (1) The PMH fills up with a quantity q from upstream sources. (takes $t_f$ time) 3. The PMH runs a mixing operation on the captured quantity q of fluid (takes $t_q$ time) 4. In parallel to PMH, the heat exchanger engulfing the cylinder is exchanging heat with the captured fluid (take $t_h$ time) 5. Repeat steps (1) and on.

This is the continuous operation protocol for the PMH.

The above operation can be enhanced with piston rotation.

Balancing the Ingredients

The PMH is called to generate a desired mixture off ingredients: $a_1, a_2, \ldots a_f$. The quantum is expected to contain a particular combination of these ingredients: $m_1, m_2, \ldots m_f$. The f ingredients are stored each in a capacity tank where the level or quantity of each ingredient may vary to some degree over time. There is a pipeline leading from each of the f inlets to the round circular edge of the PMH cylinder, and those inlets are fitted with valves which in turn are controlled by the PMH controller.

In a simple embodiment various tests would establish the desired states of the f valves, and this state will be set forth by the PMH controller when it comes time to feed in a new quantum of fluid into the cylinder. In this case the valve will switch from "closed" to the designated open state and back.

In a feedback mode, the inlet pipes will be fitted with flow sensors and provide the PMH controller with 'live' data of the stream of each of the f ingredients into the cylinder. This is accomplished by fitting flow meters on the inlets and feeding the reading to the PMH controller. Such data can be subjected to calculation that will lead to position adjustments of the various f valves.

Illustration: a PMH is to mix two ingredients x, and y at a ratio 25:100 of x:y. The PMH controller sets the valves to accommodate this target ratio. The x and y inlets are fitted with flow meters. The reading has shown that when a quarter of the quantum has been suctioned in the actual ratio between the two ingredients was: 48:100. The controller will move quickly to correct the distorted ratio of the ingredients. The controller will calculate how much more y relative to x should be streamed into the cylinder in the remaining ¾ of the flow.

Integrating the flow of x and y to the point of measurement, shows that in total a quantity of 370 millimeters have streamed in. The ratio 48:100 implies that 120 ml from x are in and 250 ml from ingredient y are in. The total volume of the quantum is to be 1600 ml. The controller will therefore adjust the flow for the remaining ¾ of the cylinder to be at ratio: 19.4:100 (x:y). so that 200 ml from ingredient x and 1030 ml from ingredient y will flow into the cylinder. When the cylinder is full the ratio will be: (120+200):(250+1030)= 25:100, as intended, and the total volume will be: 1600=120+200+250+1030 milliliter.

Piston Rotation

While moving forward and backward the piston could rotate to increase the efficiency of mixing. This applies only for the mixing steps, not to the filling in and discharging steps. The rotational speed may be slow or fast, constant of varying.

Two modes are identified: (i) fixed holes rotation, and (ii) switch holes rotation. In the former mode, the entire disc or (two discs in fixed configuration) rotate together, and the holes are each rotating in the same angular speed around the axis of the shaft of the piston. In the latter mode, the second disc that is used to either leave the holes open or leave them close, is the rotating disc, and as it rotates it opens up different groups of holes in the upper disk, and just insuring that the fluid will be flowing from different hole position at each subsequent time interval.

Design

The PMH concept may be designed in a rich variety of embodiments. The degrees of freedom to be determined by the designer are many:

1. quantity of the quantum fluid, q 2. the combination of cylinder length and cylinder diameter 3. The power generation system to move the piston around. 4. The piston 5. Piston Rotation solution (if any) 6. The control program to operate the PMH 7. The heat exchanger, if any 8. The inlets/outlets 9. The capacity tanks before and after the PMH The designer may consider an array of PMH to meet some specific objectives. An array may be configured as a PMH in a series or in parallel, or some combination.

The Piston

The piston per se has a given diameter derived from the selected diameter of the cylinder. However, its thickness is a design parameter, and any combination with a second disc adds more design parameters.

Given a piston setup, the designer will have to select the size and the configuration of the flow-through holes in the piston, together with the angle (off perpendicular) for each of the holes. The mixing effect will be enhanced if two jets collide as they emerge onto a collision course from two adjacent holes. This collision effect will guide the designer to drill slanted holes. Given sufficient thickness of the piston the fluid as it passes through the piston will assume momentum in the direction of slanted hole. An adjacent stream of fluid might assume similar momentum aimed at a collision direction, with the net effect of forced mixing of the two jets. We regard these slanted holes as piston flow tunnels.

The faster the piston move up or down, the greater the flow rate through each hole in the opposite direction. If the piston is moved ahead with a force F over the piston area $A=d^2\pi/4$ (d is the diameter of the piston/cylinder). This pressure, P, dissipates in all directions of the fluid (perfectly so when the fluid is not yet moving), so a first assumption is that the force the propels the fluid trapped in the piston tunnel if $F_h=P*A_a$, where $A_h$ is the area of the hole. $F_h$ has to overcome the traction resistance of the fluid inside the wall of the piston tunnel. This force attaches momentum to the bursting fluid outside the piston tunnel.

A critical design question relates to the jet emergence angle, $\alpha$ (off the perpendicular option). On one hand the larger the value of $\alpha$ (<90 degrees), the more of a direct hit is achieved between two colliding streams, and hence the more mixing between the two jets. However such strong angle requires a nearly horizontal piston tunnel. Such nearly horizontal tunnel will require a long tunnel, with a great traction area for the fluid to be held back by friction. The greater the friction resistance, the less momentum is left to the emerging stream and hence the less mixing.

This leads to the conclusion that somewhere in the range $0 \leq \alpha \leq 90$ there exists an optimum, which is based on the holes configuration over the piston.

Heat Exchange

One can design the cylinder with a high ratio between the height (length) of the cylinder to its diameter. This will make the heat exchange more efficient since more of the captured fluid will be in touch with the surface of the heat exchanger. In a complex situation two consduqncitive reactions may need vastly different temperature and hence a sequence of two or more PMH units will be set up. In complex situation reactions may be endothermic or exothermic and heat may need to be pulled out or pushed in the cylinder. In general the full energy of the piston movement is translated to heat and may have to be removed to keep the mixture in the desired temperature.

Applications

Categories:
1. mixing 2. reacting 3. external effects 4. separation

Mixing

Range:
1. gas phase applications 2. low viscosity liquid applications 3. high viscosity liquid application 4. fast reactions 5. slow reactions 6. Graded mixing applications Mixing is so prevalent and the QFO will apply to the its full range, from small medical devices, to large sludge clearing operations.

Mixing (and reacting) can take place in an open vertical cylinder.

Graded Mixing Applications

The QFO can be used to effect graded mixing; mixing where the mixed ingredients are not thoroughly mixed but rather mixed to a desired degree where each constituent maintains continguous blocks of its own kind, and the blocks fit into a sort of mosaic. Such graded mixture can be used to define a shapeless language (see patent U.S. application Ser. No. 16/997,819). It may serve as decorative implement too.

Reacting

In many cases a simple thorough mixing of the reactants will generate the reaction needed. In other cases the temperature of the mixture has to be adjusted, and the apparatus needs a heat exchanger. The PMH solution allows for a small cylinder to allow for as much time as needed to bring the capsule to the target state.

External Effects

A captured quantum of fluid can be subjected to a precise external effect. For example a precise dose of a precise wavelength of electromagnetic radiation. Alternatively—radio active radiation. In simpler cases the quantum fluid will be heated of chilled to an exact desired temperature.

Separation

Fluid phase separation is an ubiquitous step in industrial chemistry. While it appears strange that a system geared towards mixing will also achieve separation, the explanation is simple. In mixing one exploits the momentum acquired by fluid emerging from the holes in the moving piston, in separation one exploits the fact that some parts of the fluid are more efficient in traveling through holes and tunnels than others. This distinction can accomplish separation.

In this QFO application, a quantum of fluid is captured in a QFO cylinder, and an "opened" state piston is moving from one side of the cylinder to the other. The fluid contains parts that more readily flow through the holes of the piston and parts that less readily flow through the holes of the piston. As the piston is plowing its way through the quantum of fluid the fluid has not way to go except to pass through the holes in the piston to the volume behind the piston. The parts that more readily flow through holes will be found in greater concentration in the volume of fluid behind the moving piston. Of course, if, like in mixing the piston moves all the way to the other end of the cylinder then, the quantum fluid has only ephemeral spatial change in concentration. If the piston then moves back to the original side then the net result in terms of separation is zero.

However, in separation the motion of the piston is stopped before it arrives at the end of the cylinder. It stops at the 'separation cut'. That is a point before the end of the cylinder. When the piston stops at the separation cut, it divides the quantum of fluid into a behind volume and an ahead-volume. The behind volume is where the part of the fluid that flows easier through the holes is of higher concentration than it was in the quantum fluid as a whole. And the ahead-volume is where the part of the fluid that is less readily flowing through the piston holes, is of higher concentration than it was in the original quantum of fluid.

This simple process achieved a degree of separation. The next step is to separate the ahead-volume from the behind-volume. Once separated then each part may become a quantum fluid for a successive QFO-separation apparatus, thereby constructing a cascade. The cascade will yield greater and greater separation.

This separation may be a bit more complex for more than two ingredients but a long enough cascade will accomplish it. For different separation tasks, the holes geometry may be adjusted.

There are several possibilities for such flow readiness distinction:
1. slurry and suspension 2. density variance 3. viscosity variance 4. electrophoresis 5. Chromatography

Slurry and Suspension

Separating slurry from its suspending fluid can be done by adjusting the size of the piston holes to the size distribution of the slurry particles. The holes will be rather slanted to generate a longer path for the slurry to move through the piston. Particles might pile up and generate temporary stoppage. A stopped tunnel will not allow anything to pass through. This will leave the other tunnels to carry the load. Tunnels that happen to be not so loaded with particles will exhibit a more efficient flow.

Over time more and more tunnels will be stopped through accumulation of solid particles. The other, open tunnels will not be sufficient to pass all the fluid that must go through. We assume that the piston is moved in a deliberate speed (perhaps constant speed). As more and more tunnels are being stopped, the piston requires more force to keep it going in the same speed. This force will be represented as increased pressure on the volume-ahead. Pressure in fluid spreads to all directions, and also in the direction of the stopped tunnels. As the pressure rises, it will come to the point where it is so strong that it breaks the stoppage of the tunnel, and returns this tunnel to a normal flow. As this happens, then less force is needed to keep the piston moving in the same speed, that means less pressure in the ahead fluid. All in all this apparatus offers a basic balance. When more tunnels are stopped, the pressure goes up and opens some tunnels. In summary this mechanism will effect a separation between the carrying fluid and the suspended solid particles.

The designer of slurry separation may make good use of the rotational option of the piston, to break piling up of large particles outside the holes (tunnels) in the ahead-volume. Another aid may be rotational blade scraping the piston at the ahead-volume side.

Density and Viscosity Variance

The moving piston generates pressure that forces the captured fluid to pass through its tunnels (holes). The lower density parts of the fluid will develop a greater velocity from the same pressure (force) that generates a lower velocity for the higher density parts. Higher velocity translates to higher throughput, and hence as the piston moves ahead in the quantum fluid, more low density fluid is found in the behind-volume of the piston, effecting separation.

A similar effect happens in the case where different elements of the capsule have different viscosities. The high viscosity elements will flow at a lower flow rate than the high viscosity elements.

A combination of contributing density and viscosity variance will be most helpful.

Viscosity offers a special option. It is relatively easy to generate viscosity changes among similar chemical structures. The viscosity of polymer is dependent on its molecular weight. Under the same concentration, polymer of higher MW will have a higher viscosity.

Electrophoresis

Fluids containing charged particles can be separated by connecting the moving piston to an electrical potential. If the voltage is positive, then the negative particles will accelerate towards the piston. Some of these accelerating particles will be aiming at the open hole and be pushed from behind to go through the hole (tunnel). This effect will be built up by letting the piston rotate at the optimal speed.

Chromatography

The holes in the QFO piston may be filled with chromatographic discrimination media so as to separate between constituents of the quantum fluid. The speed of the piston will have to be adjusted to the rate of the chromatography. Some very localized temperature adjustment may be applied to the inner walls of the piston holes where the chromatographic media is placed.

Distillation

Distillation is normally accomplished through a succession of flow and counterflow distillation trays. The QFO alternatives will call for a series of capacity tanks with graded fluid in terms of separation of volatile and less volatile constituents. A QFO unit may admit a Q amount of liquid to its bottom, then place the piston in "closed" state on top of the liquid surface. The volume of the QFO cylinder in this case, V, is much larger than Q: $Q<<V_c$. Next the openings to the cylinder are closed and the piston rises, (still "closed") and thereby creates a vacuum above the liquid. All the while the walls of the cylinder are heated up through a heat exchanger fluid. The combined effect of vacuum and heating causes the liquid to evaporate such that the gaseous phase is richer with the more volatile constituents. When the piston reaches the top of the cylinder, there is less liquid in the cylinder, and it's covered by a 'cloud' of gaseous phase of the balance of the quantum pulled in. At that point the piston (at the top spot) will shift to "open" state, and slide back down. As it does so the gas zips through the open holes from the ahead volume of the piston to the behind volume of the piston. When the piston touches the liquid phase, all the gas is above it. At this point the piston switches back to "closed" state and thereby it separates the gaseous phase, richer with the volatile constituents versus the liquid phase, richer with the less volatile constituents. The piston can then push each phase out separately and then push out the other phase. The two phases go to separate planned destinations. The separation may be satisfactory, or it may be a basis for another round on both parts of the original quantum. The gaseous phase will have to be condensed to liquid to be served to the next round of a similar protocol. The protocol is iterative.

Each QFO unit may feed to two others, and each of them to two others, with some feedback optionally.

An alternative protocol, will first remove the gaseous phase from the cylinder (after the piston came down and separated between the gaseous phase and the liquid phase). This will be done by moving the piston upwards from the surface of the liquid, and opening an outlet for the gas in the cylinder. As the piston rises, it pushes the gaseous phase out, but it again creates vacuum above the remaining liquid in the cylinder, and the heat exchanger may also be activated. This causes more liquid to evaporate, and the sequence above may be repeated. It may be iterated for as long as there is liquid left. The separation efficiency goes down though. But for some cases this may be a better strategy.

The above protocols may be fully automated. The movements and states of the piston and the states of the various valve may be computer coordinated.

Summary

Quantum Fluid Operation

Mixing, Reacting, Separating: Efficiency, Precision, integration

Fitting a Precise Batch Treatment of Fluid Within an Uninterrupted Continuous Flow Regimen Presenting a technology wherein a continuous flow, typical of industrial chemistry is handled in a way of marking a quantum of fluid at a time, treating this quantum in a focused way to establish new efficiency and better precision. This quantum operation lends itself to integration, and to constructing cascades of the same. Applicable at any scale, effective for any viscosity.

The advantages of this quantum regimen is that the quantum of fluid can be treated in precision with feedback data, and without a rush of the clock. It is applicable to any treatment of fluid. What is described here are applications to mixing, reacting, and separating.

This invention describes a system called "Quantum Fluid Operation" (QFO) for secluding a quantum of fluid in a continuous industrial flow, and treating this quantum as batch operation without affecting the control flow before and after the QFO; the QFO comprising:
1. input fluid capacity tanks, (A tanks)
2. output fluid capacity tank, (C tank)
3. a quantum fluid container, (B)
4. operational implements.

The total flow of all the fluids $a_1, a_2, \ldots a_f$ through the f A tanks is at a constant flow rate q&incexa, and the constant flow rate to the output fluid capacity tank is $q_c = q_a$; a quantum of fluid of measure Q is taken out of the f A tanks during time interval $t_{in}$, and is accumulated in the quantum fluid container, (B), which is big enough to contain the quantum fluid; next the operational implements operate (treat) on the quantum Q contained in B for a period of time $t_q$; next the quantum Q is pumped out of the container B to the output fluid capacity tank, (C), over a period of time $t_{out}$, the identified flow rates and timings comply with the following equation:

$$Q = q_a * (t_{in} + t_q + t_{out}) = q_c * (t_{in} + t_q + t_{out})$$

And where the operational implements operating on the quantum of fluid Q, change the state of the quantum to a desired state, S=S(Q), and where the quantum treating time, $t_q$, is extended as needed to insure that the quantum of fluid leaves the quantum fluid container, (B) at the desired state, S(Q).

In particular embodiment one finds that the desired state of Q, S(Q) is expressed as the desired temperature of Q, ($T_q$) and the desired state of mixing of the f ingredients $a_1, a_2, \ldots a_f$, M, and where the operational implements include a QFO control program, CP, that controls all the flows of the system, and where the quantum container is a cylinder that contains the quantum of fluid, and where (i). the desired temperature, $T_q$ is achieved via a heat-exchanger surrounding the outer walls of the cylinder, and where the CP controls the flow and temperature of the heat-exchanger fluid that adjusts the temperature of the quantum Q to be $T_q$, and where (ii). the desired degree of mixing, M, is achieved with a piston that is moved along the cylinder back and forth, and is rotating around the axis of the shaft that moves the piston, and where the piston has two states: "Open" and "closed", where in "closed" state the piston acts like a normal piston: it moves the fluid ahead of its direction of motion to exit the cylinder, and where in "open" state the piston has several holes in it so that when the piston moves in a certain direction, and there is no escape route for the fluid in that direction, then the fluid ahead is forced to flow in the opposite direction through the holes in the piston, and where (iii) the f inlets are fitted into the round ingress plate at one end of the cylinder, and where (iv) the outlet is fitted into the round egress plate at the other end of the cylinder, and where (v) the control program executes the following sequence:
(a) The piston in state "closed" is positioned abreast of the ingress plate in the cylinder, (position '1'),
(b) The f inlets are opened and the piston in state "closed" is moved to the other side of the cylinder (position '2') thereby pulling a quantum Q comprised of the f inlet fluids to fill up the cylinder,
(c) the piston is switched to "open" state, the outlet and the f inlets are closed, and the piston moves from position 2 back to position 1, while rotating around its axis, and thereby forcing the quantum of fluid to travel through the holes in the piston to the growing volume behind the progressing piston,
(d) when the piston arrives at position 1, then if the quantum of fluid is in the desired state, S(D), then the piston shifts to "closed" position, the f inlets and the outlet are opened up by the Control Program, and the fluid is pushed ahead to the next station in the chemical processing line;

if the quantum of fluid is not yet at the desired states, then the f inlets and the outlet remain closed, and the piston remains in "open" state and is moved back to position 2, where it repeats step c above.

In particular implementation the piston is of thickness, g, and the holes in the piston are drilled diagonally, at angle α relative to perpendicular holes, such that the length of a hole is h=g/cosine(α). which is also the direction of the jet of fluid emerging from the hole, and where holes are paired such that two emerging jets collide with each other creating an effect of mixing.

Piston construction: the piston is comprised of two abreast discs where the second disc can rotate relative to the first disc, and where the two discs have matching holes drilled into them and where the discs will be aligned so that no holes are overlapping, to present the piston "closed" state, and where the discs will be aligned so that one or more holes are overlapping and admit transfer of fluid from one side of the piston to the other.

The invented system is also used to effect separation. It happens where the quantum of fluid, Q, is comprised of two constituents, X and Y, in a mixed state, and where the Quantum Fluid Operation, (QFO) is aimed to divide Q to a part $Q_x$ which is richer in constituent X than Q, and a part $Q_y$, which is richer in constituent Y than Q, such that: $Q=Q_x+Q_y$, and where Q is removed from the quantum fluid container by disposing of $Q_x$ into a fluid container $C_x$ and $Q_y$ is disposed into a fluid container $C_y$.

The above process may continue: where $Q_x$ is subject to the same operation wherein $Q_x$ is divided to a part $Q_{xx}$ which is richer in constituent X than $Q_x$, and a part $Q_{xy}$ which is richer in constituent Y than $Q_x$, and where $Q_y$ is subject to the same operation where $Q_y$ is divided to a part $Q_{yx}$ which is richer in constituent X than $Q_y$, and a part $Q_{yy}$ which is richer in constituent Y than $Q_y$, and where:

$$Q_x = Q_{xx} + Q_{xy}$$

$$Q_y = Q_{yx} + Q_{yy}$$

and where this re-application of the system is iterative, and applies respectively to more than two constituents.

The above operation may be accomplished where a piston with holes in it is being moved inside the cylinder that contains the quantum of fluid Q; the piston is first stationed at position $p_1$, at one side of the cylinder, side 1, and is being moved towards the other side of the cylinder, side 2; the piston stops at a position r, which is between position $p_1$ and position $p_2$, at the other side of the cylinder: $p_1 < r < p_2$, such that the quantum of fluid Q is divided to part $Q_{ahead}$, captured between r and $p_2$, and $Q_{behind}$ captured between $p_1$ and r, and where constituent X in Q is flowing more efficiently through the holes of the piston than constituent Y, and thereby $Q_{behind}$ is richer in constituent X than Q and $Q_{ahead}$ is richer in constituent Y than Q.

The piston may be constructed as follows: the piston has two states "open" where holes are opened in the piston, and "closed" where no holes are opened in the piston, and where after arriving at point r, the piston shifts from "open" state to "closed" state, and then it pushes $Q_{behind}$ to side 1 of the cylinder which respectively is opened with an outlet allowing $Q_{behind}$ to leave the cylinder, and it also pushes $Q_{ahead}$ to side 2 of the cylinder, which respectively is opened with an outlet allowing $Q_{ahead}$ to leave the cylinder, and thereby drain the cylinder from Q, making it ready for another Q to be suctioned in.

The constituents X and Y may differ in specific gravity, and/or in viscosity.

The case may be where constituent X is liquid and constituent Y is particles of various sizes.

The separation may be enhanced with the piston being scraped with a rotating blade removing solid particles that pile up and clog opening of the piston.

Another embodiment of the invention is where constituents X and Y differ in electrical polarity, and where the moving piston is set to an electrical charge so that constituent X is attracted to the moving piston, while constituent Y is rejected from the moving piston, thereby making $Q_{behind}$ richer with constituent X, and $Q_{ahead}$ richer with constituent Y.

The piston assembly may be constructed as follows: the switch of the piston from "opened" state to "closed" state and back is accomplished by comprising the piston from two abreast discs of matching holes such that by aligning the disc one way there is no overlapping between the holes in the two pistons, and by aligning the discs in some other ways there are different sets of holes in the piston created by an overlap between the holes in the two discs, and the discs are moved back and forth through a co-axial shaft.

What is claimed is:

1. An apparatus comprising:
a cylindrical container comprising a first end wall, a second end wall, and a sidewall extending from the first end wall to the second end wall, the cylindrical container defining an interior for holding a quantum of fluid, wherein the first end wall comprises at least one inlet, the at least one inlet having at least one inlet valve, and the second end wall comprises at least one outlet, the at least one outlet having at least one outlet valve;
a piston within the interior of the cylindrical container, the piston reciprocable along the central axis of the cylindrical container, the piston comprising first and second discs, the first and second discs rotatable relative to each other about the central axis of the cylindrical container, the first disc having a first plurality of through holes, the second disc having a second plurality of through holes, wherein a closed state exists such that the first plurality of holes are closed to fluid passage by solid portions of the second disc, and an open state exists such that the first plurality of holes are open to fluid passage, relative rotation of the first and second discs permitting adjustment between the open and closed states, wherein at least two holes of said first plurality of holes are angled such that fluid passing therethrough forms colliding jets; and
a control system for controlling the at least one inlet valve, the at least one outlet valve, the reciprocation of the piston, and the relative rotation of the first and second discs.

2. The apparatus of claim 1 wherein the piston can be set in a plurality of open states, where in each of those open states the alignment between the first disc and the second disc is different, and in each of those different states, a different subset of the first plurality of holes are open for fluid passage.

3. The apparatus of claim 1 constructed with the through holes in the first disc, and the through holes in the second disc each of a flow area adjusted to the degree of mixing desired: smaller fluid passage area for more thorough mixing, and larger fluid passage area for more limited mixing.

4. The apparatus of claim 1 wherein the cylindrical container is enveloped with a heat exchanger to regulate the temperature of the quantum of fluid locked inside the cylindrical container during the reciprocable movement of the piston inside the cylindrical container.

5. The apparatus of claim 1 wherein the cylindrical container is fitted with an injection apparatus to inject additives into the quantum fluid locked inside the cylindrical container during the reciprocable movement of the piston inside the cylindrical container.

6. The apparatus of claim 1 wherein a sequence of configurations is effected by the control system, as follows:
(i) Suction: the at least one inlet valves are set to open state, the at least one outlet valves are set to open state, the piston is set to open state, and is moved from the first end wall to the second end wall;
(ii) mixing: the at least one inlet valves are set to closed state, and the at least one outlet valves are set to closed state, the piston is set to open state and is moved back and forth between the first end wall and the second end wall until the desired mixed state is achieved;
(iii) draining and suction: the at least one inlet valves are set to open state, the at least one outlet valves are set to open state, and the piston is moved from the first end wall to the second end wall; draining the mixed quantum of fluid from the cylindrical container and suctioning into the cylindrical container a new quantum of fluid.

* * * * *